(12) United States Patent
Antosik et al.

(10) Patent No.: US 6,792,005 B1
(45) Date of Patent: Sep. 14, 2004

(54) TIMING CIRCUITRY FOR MUXING/DEMUXING OF OPTICAL COMMUNICATION SIGNALS

(75) Inventors: Roman Antosik, Colts Neck, NJ (US); Andrew Schnable, Cary, NC (US); Lewis K. Stroll, Morganville, NJ (US); Richard L. Ukeiley, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 591 days.

(21) Appl. No.: 09/658,516

(22) Filed: Sep. 8, 2000

(51) Int. Cl.[7] .................................................. H04J 3/06
(52) U.S. Cl. ...................... 370/535; 370/536; 370/537; 398/43; 398/155
(58) Field of Search ................................ 370/357, 358, 370/535, 536, 537, 538; 398/43, 45, 155

(56) References Cited

U.S. PATENT DOCUMENTS

| | | | |
|---|---|---|---|
| 4,845,711 A | * 7/1989 | LeFort et al. | 370/242 |
| 5,757,793 A | 5/1998 | Read et al. | 370/358 |
| 5,815,490 A | 9/1998 | Lu | 370/223 |
| 6,014,414 A | 1/2000 | Yamamoto et al. | 375/356 |
| 6,078,595 A | * 6/2000 | Jones et al. | 370/503 |

FOREIGN PATENT DOCUMENTS

| | | |
|---|---|---|
| EP | 0 813 319 A | 12/1997 |
| EP | 0 874 488 A | 10/1998 |
| EP | 1 091 529 A | 4/2001 |

OTHER PUBLICATIONS

"PHASE: Flexibility and Modularity from STM–1 to STM–16", by Lucent Technologies Optical Networking, Online, Mar. 1998, XP002189185, pp. 1–8.

* cited by examiner

Primary Examiner—Kenneth Vanderpuye
Assistant Examiner—Joshua Kading

(57) ABSTRACT

Circuitry for a node of an optical communication network is configured to mux (i.e., combine) one or more incoming customer signals for transmission as a single outgoing optical signal and to demux (i.e., split) an incoming optical signal into one or more outgoing customer signals, where the muxing and demuxing clocks are selected from one or more customer clocks recovered from the one or more customer signals, an input clock recovered from the incoming optical signal, and a local clock generated by a local clock generator. When configured for an add/drop configuration, the circuitry selects (1) the muxing clock from the one or more customer clocks, the input clock, and the local clock and (2) the demuxing clock from the input clock and the local clock. When configured for a drop/continue configuration, the circuitry is configured to select both the muxing and demuxing clocks from either the first input clock or the local clock. The circuitry is configured to perform a hardware-based switch to select the backup clock as the new muxing clock upon detection of a loss-of-clock condition for the previously selected muxing clock. The node automatically coordinates its selection of muxing clocks with the other corresponding node in order to avoid loop-timing problems.

20 Claims, 20 Drawing Sheets

FIG. 3
(PRIOR ART)

| OC48 HEADER | 1ST STS3 | 2ND STS3 | 3RD STS3 | 4TH STS3 | 5TH STS3 | 6TH STS3 | 7TH STS3 | 8TH STS3 | 9TH STS3 | 10TH STS3 | 11TH STS3 | 12TH STS3 | 13TH STS3 | 14TH STS3 | 15TH STS3 | 16TH STS3 |

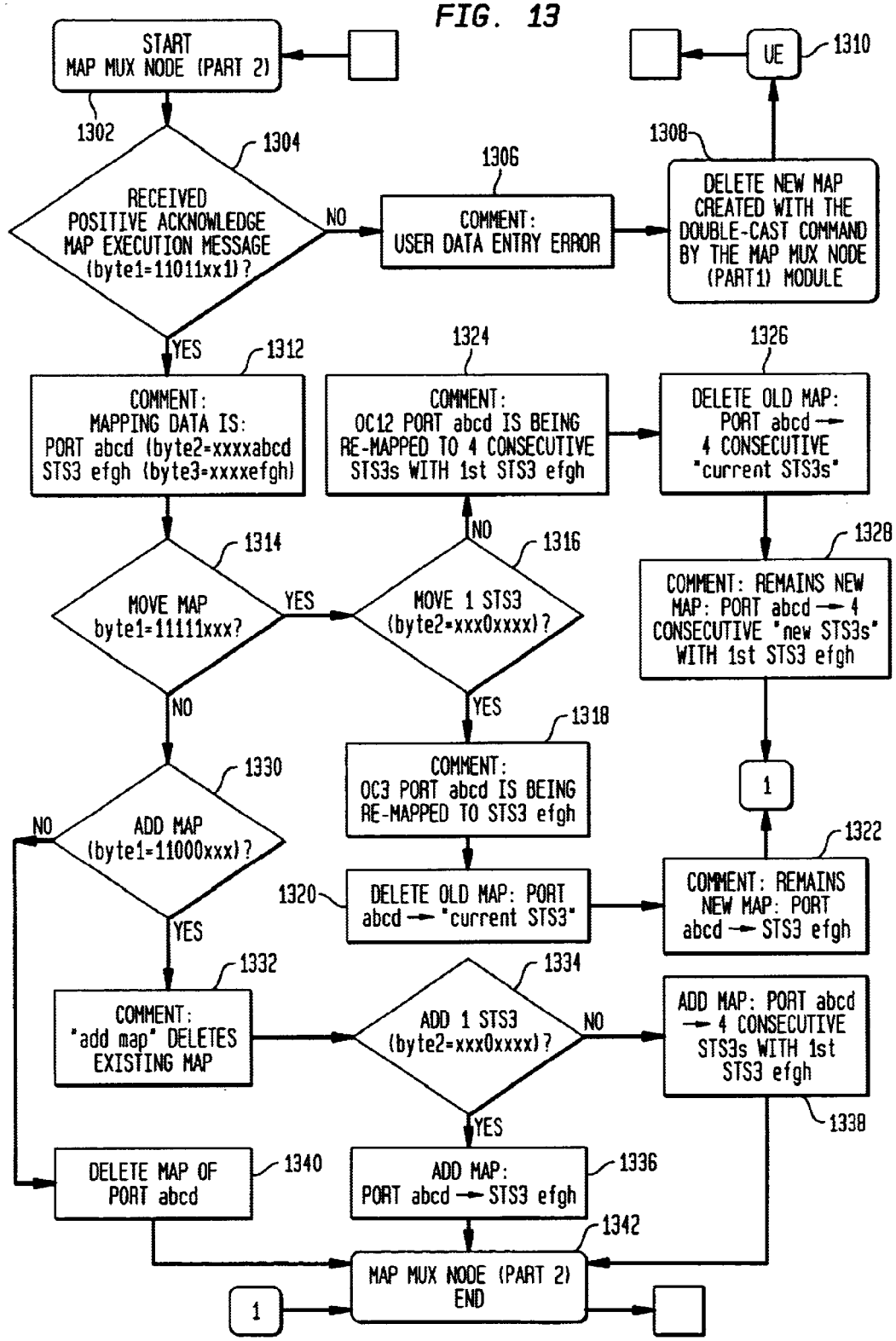

FIG. 15

TIMING CIRCUITRY FOR MUXING/ DEMUXING OF OPTICAL COMMUNICATION SIGNALS

BACKGROUND OF THE INVENTION

1. Field of the Invention

The present invention relates to optical communications, and, in particular, to nodes for optical communication networks that support provisioning of optical signals.

2. Description of the Related Art

A typical optical communication network conforming to the Synchronous Optical Network (SONET) standard, comprises a set of nodes interconnected by fiber optical links. When the optical communication network is based on dense wavelength division multiplexing (DWDM), each optical fiber may simultaneously carry a number of different optical signals, where each different optical signal is transmitted at a different wavelength. In general, the different optical signals transmitted over a single optical fiber may have different data rates. For example, some of the optical signals may be OC3 signals having a data rate of 155 megabits/second (Mb/s), while other optical signals may be OC12 signals having a data rate of 622 Mb/s, and still other optical signals may be OC48 signals having a data rate of 2.5 gigabits/second (Gb/s).

In conventional SONET-based optical communication networks, each node is configured with circuitry designed to provision optical signals for communication with other nodes over their corresponding interconnecting optical links. In general, provisioning of optical signals refers to one or more of (1) adding a new optical signal to the communications, (2) deleting an existing (i.e., live) optical signal, (3) increasing the data rate of an existing optical signal (referred to as a "rate-upgrade"), and (4) decreasing the data rate of an existing optical signal (referred to as a "rate-downgrade"). In conventional nodes for SONET-based optical communication networks, different circuit boards are provided for the different optical signal data rates. For example, a particular node may have one or more circuit boards designed to handle only OC3 signals, one or more other circuit boards designed to handle only OC12 signals, and one or more additional circuit boards designed to handle only OC48 signals.

A typical node for a SONET-based DWDM optical communication network that uses, for example, 40 different wavelengths per fiber may be configured with different numbers of OC3, OC12, and OC48 circuit boards that, taken together, are able to provision up to 40 different customer signals for communication over a given optical fiber with another node. In theory, each DWDM wavelength is able to support the highest bandwidth signal (e.g., OC48). In this example, wavelengths that are assigned OC3 or OC12 optical signals are underutilized in terms of their available data bandwidth.

SUMMARY OF THE INVENTION

The present invention is directed to circuitry for nodes in optical communication networks, such as SONET-based DWDM optical communication networks, that enables more efficient use of available data bandwidth. In particular, according to certain embodiments of the present invention, a single circuit board for a node is capable of packing a number of different outgoing customer signals (e.g., OC3/OC12-rate signals) into a single outgoing optimum-rate optical signal (e.g., OC48 optical signal) for transmission at a particular wavelength over an optical fiber to another node. The circuit board is also capable of unpacking a number of different incoming customer signals from a single incoming optimum-rate optical signal received from the other node over the same or a different optical fiber. Moreover, those different outgoing and incoming customer signals may have different data rates (e.g., both OC3-rate and OC12-rate signals packed into a single OC48 optical signal).

As an example, in one embodiment of the present invention for a DWDM optical communication network that uses 40 different wavelengths per optical fiber, where each wavelength can support a different OC48 optical signal, each circuit board in each node of the network is capable of (1) packing up to eight different OC3/OC12-rate outgoing customer signals into a single outgoing OC48 optical signal transmitted at one of the 40 DWDM wavelengths and (2) unpacking up to eight different OC3/OC12-rate incoming customer signals from a single incoming OC48 optical signal transmitted at the same DWDM wavelength. Each node can be configured with 40 such circuit boards for each pair of outgoing and incoming optical fibers (or each optical fiber in the case of bi-directional communications on one fiber), with each circuit board handling a different pair of outgoing and incoming composite OC48 optical signals, each one sent on one of the 40 DWDM wavelengths. Such an embodiment is therefore able to support up to 320 different pairs of outgoing and incoming customer signals per pair of optical fibers, as opposed to the prior art limit of only 40 different pairs of customer signals per pair of optical fibers.

In certain embodiments, the present invention relates to the field of optical networking using DWDM or time division multiplexing (TDM) technology and SONET/SDH (Synchronous Digital Hierarchy) mixed-rate muxing and demuxing of OC3/OC12 optical signals to/from an OC48 DWDM optical signal to increase efficiency of use of network capacity. The invention addresses the complexity problem of off-line and in-line provisioning to add/delete/rate-upgrade/rate-downgrade the mixed-rate signals, while reducing service interruptions of live signals. The invention serves the purpose of simplifying the above-mentioned provisioning with an algorithm-based, automatic assignment of the STS3 time slots in OC48 frames to the provisioned mixed-rate signals and by automatic transmission and execution of the port number to STS3 time slot map in both muxing and demuxing nodes.

In the prior art, muxing and demuxing OC3/OC12 optical signals requires manual mapping of the STS3 time slots to the signals. There is no transmission of the map between the muxing and the demuxing nodes. The disadvantage of the prior art is that each addition/deletion/rate-upgrade/rate-downgrade of an OC3/OC12 signal requires retrieval of the existing time slot assignment map and manual re-assignment of the STS3 time slots in both muxing and demuxing nodes. In the case of an OC3-to-OC12 rate-upgrade or addition of a new OC12 signal, the provisioning may require a re-map of existing signals to new STS3 time slots, which may result in failing those signals for a relatively long time due to lack of synchronization between muxing and demuxing nodes. Manual mapping of the STS3 time slots is time consuming and prone to data entry errors. It may be acceptable in applications when signals are provisioned only once in their lifetime. In TDM/DWDM networks, however, the network provider is interested in a frequent re-provisioning of the network-muxed OC3/OC12 signals to satisfy changing needs for bit-rate and changing owners of the signals.

In one embodiment, the present invention is a first node for an optical communication network, the first node having circuitry comprising (a) a first set of one or more receivers configured to generate an incoming customer data signal and a customer clock from each of one or more incoming electrical customer signals; (b) a first clock-and-data-recovery (CDR) circuit configured to generate a first incoming data signal and a first input clock from an incoming electrical signal having a third frame format at a third data rate; (c) a local clock generator configured to generate a local clock; (d) muxing circuitry configured to combine the one or more incoming customer data signals into an outgoing data signal having the third frame format; (e) demuxing circuitry configured to split the first incoming data signal into one or more outgoing customer data signals; (f) a set of one or more transmitters configured to transmit each outgoing customer data signal as an outgoing electrical customer signal; and (g) timing circuitry configured to select a muxing clock for the muxing circuitry and a demuxing clock for the demuxing circuitry from the one or more customer clocks, the first input clock, and the local clock.

The present invention provides easy to execute, fast, data entry and transmission error free, off-line and in-line automatic provisioning of SONET/SDH point-to-point configuration of muxing and demuxing nodes in the TDM, or DWDM networks.

BRIEF DESCRIPTION OF THE DRAWINGS

Other aspects, features, and advantages of the present invention will become more fully apparent from the following detailed description, the appended claims, and the accompanying drawings in which:

FIG. 3 shows a high-level diagram of a conventional OC48 frame;

FIG. 13 shows a flow diagram of Part 2 of the process of mapping the muxing node, according to one embodiment of the present invention;

FIG. 15 shows a block diagram of muxing/demuxing timing circuit for the mux/demux board of Node 1 of FIG. 1, according to one embodiment of the present invention;

DETAILED DESCRIPTION

Figure 1:
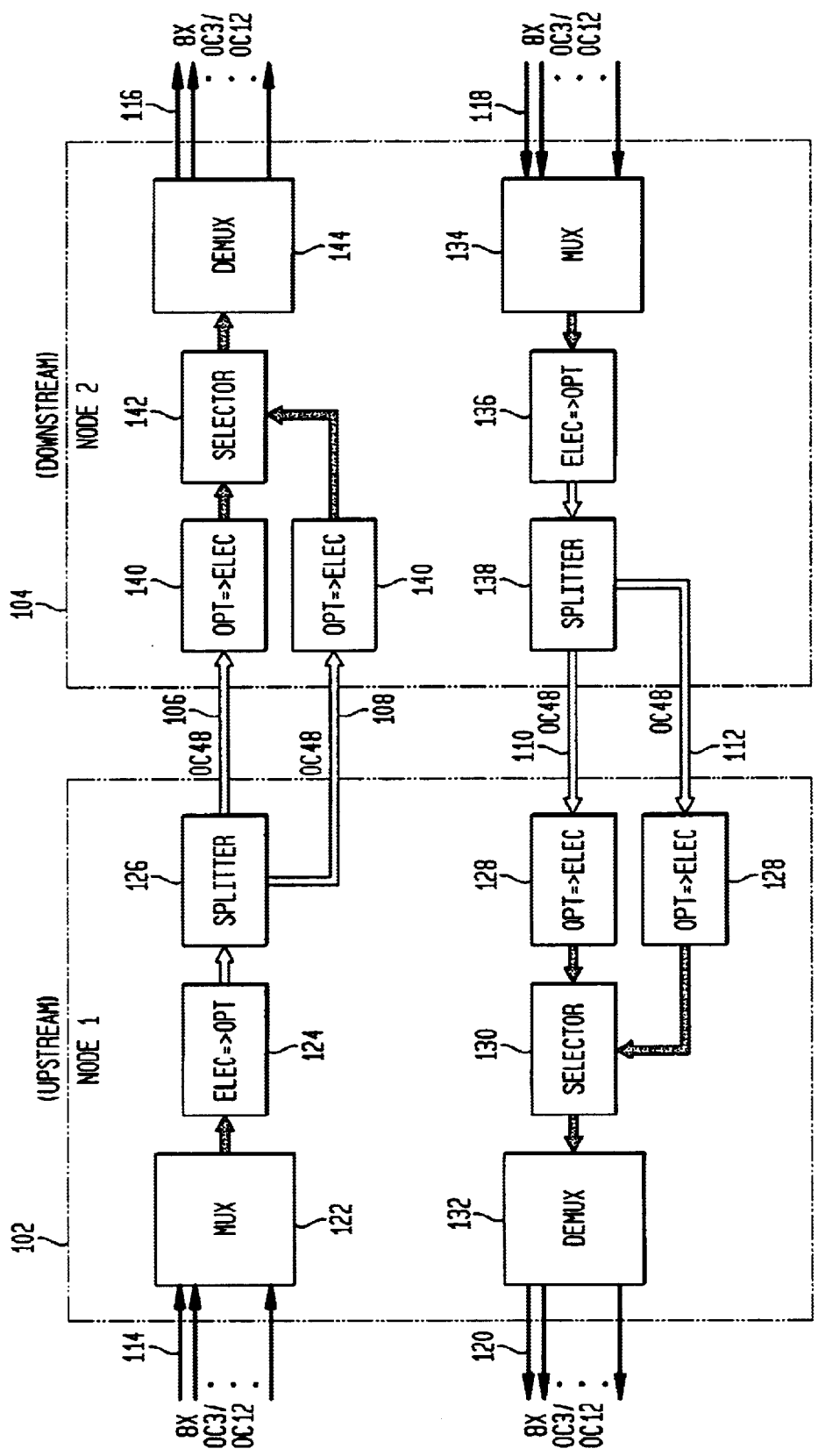
FIG. 1 shows a portion of an optical communication network having an add/drop configuration, according to one embodiment of the present invention.

FIG. 1 shows a portion of an optical communication network 100, according to one embodiment of the present invention. In particular, FIG. 1 shows two nodes of network 100—Node 1 102 and Node 2 104—interconnected by four uni-directional optical fibers 106, 108, 110, and 112. In general, network 100 may have any number of nodes interconnected in any possible topology. Moreover, Nodes 1 and 2 may be interconnected by additional optical fibers.

For purposes of explanation only, Node 1 will be referred to as the upstream node and Node 2 as the downstream node. As such, unidirectional optical fibers 106 and 108 are used to transmit optical signals downstream from Node 1 to Node 2, while uni-directional optical fibers 110 and 112 are used to transmit optical signals upstream from Node 2 to Node 1. The communications between Nodes 1 and 2 are configured with 1+1 fault protection, such that optical fiber 106 may be (arbitrarily) assumed to be the working downstream fiber, while optical fiber 108 is the physically diverse protection downstream fiber that will be selected for downstream transmissions from Node 1 to Node 2 in the event of a detected failure in optical fiber 106 (e.g., a fiber cut). Similarly, optical fiber 110 may be (arbitrarily) assumed to be the working upstream fiber, while optical fiber 112 is the physically diverse protection upstream fiber that will be selected for upstream transmissions from Node 2 to Node 1 in the event of a detected failure in optical fiber 110.

As indicated in FIG. 1, Node 1 receives up to eight different incoming signals 114 from its local customers, which incoming customer signals may be any combination of OC3-rate and OC12-rate signals. Node 1 combines (i.e., multiplexes and converts) those incoming customer signals into two copies of a single OC48 optical signal for transmission over both working and protection downstream optical fibers 106 and 108 to Node 2. Node 2 receives the two copies of the downstream OC48 optical signal from optical fibers 106 and 108, selects one of the copies (e.g., defaulting to the copy from working optical fiber 106), and separates (i.e., converts and demultiplexes) the selected OC48 optical signal to provide up to eight corresponding OC3-rate and OC12-rate outgoing signals 116 to its local customers.

Analogously, Node 2 receives up to eight different incoming signals 118 from its local customers, which incoming customer signals may be any combination of OC3-rate and OC12-rate signals, and combines (i.e., multiplexes and converts) those incoming customer signals into two copies of a single OC48 optical signal for transmission over both working and protection upstream optical fibers 110 and 112 to Node 1. Node 1 receives the two copies of the upstream OC48 optical signal from optical fibers 110 and 112, selects one of the copies (e.g., defaulting to the copy from working optical fiber 110), and separates (i.e., converts and demultiplexes) the selected OC48 optical signal to provide up to eight corresponding OC3-rate and OC12-rate outgoing signals 120 to its local customers.

To achieve this functionality, Node 1 is configured with a multiplexer (mux) 122 that combines up to eight different OC3/OC12-rate electrical signals (corresponding to the different incoming customer signals received from the Node 1 customers) into an OC48-rate electrical signal, an electrical-to-optical converter (e.g., laser) 124 that converts the OC48-rate electrical signal into an OC48 optical signal, and a power splitter 126 that generates two copies of that OC48 optical signal for transmission over downstream optical fibers 106 and 108, respectively. In addition, Node 1 is configured with two optical-to-electrical converters (e.g., photodiodes) 128 that convert the two OC48 optical signals received from upstream optical fibers 110 and 112, respectively, into two OC48-rate electrical signals, a selector 130 that selects the "better" of the two OC48-rate electrical signals (e.g., based on specified fault detection and protection criteria), and a demultiplexer (demux) 132 that separates the selected OC48-rate electrical signal into up to eight different OC3/OC12-rate electrical signals corresponding to the different outgoing customer signals transmitted to the Node 1 customers.

Similarly, Node 2 is configured with a mux 134, an electrical-to-optical converter 136, a splitter 138, two optical-to-electrical converters 140, a selector 142, and a demux 144 that are analogous to the corresponding components in Node 1, to provide analogous functionality within Node 2.

Within each node, the mux, splitter, selector, and demux are all preferably implemented on a single electronic circuit board, where each node may be configured with any number of similar circuit boards, each configured to generate a pair of OC48 optical signals (corresponding to up to 8 different outgoing customer OC3/OC12-rate signals) for transmission over a pair of optical fibers at a particular wavelength and to receive a pair of OC48 optical signals (corresponding to up to 8 different incoming customer OC3/OC12-rate signals) transmitted over a pair of optical fibers at a particular (typically the same, but possibly different) wavelength. For a DWDM optical communication network that supports up to 40 different wavelengths per optical fiber, each node may be configured with up to 40 different circuit boards for each set of four uni-directional optical fibers (i.e., upstream/downstream, working/protection fibers) connecting to another node, with each circuit board handling a different set of outgoing and incoming OC48 optical signals, each one sent on one of the 40 DWDM wavelengths. Each node may be further configured with a similar set of 40 circuit boards for each additional set of four uni-directional optical fibers connecting that node to the same or yet another node in the optical communication network.

Although the configuration in FIG. 1 shows signal splitting (e.g., by splitter 126 in Node 1) being performed in the optical domain, those skilled in the art will understand that signal splitting could be performed in the electrical domain, before electrical-to-optical conversion, in which case, an electrical power splitter would precede two electrical-to-optical converters. In that case, the electrical-to-optical conversion step could also be protected against failure within the 1+1 fault protection scheme. In theory, analogous alternative implementations are possible with regard to the optical-to-electrical converters and selector, although conventional fault detection processing is typically implemented in the electrical domain.

Although the present invention has been described in the context of uni-directional fibers, those skilled in the art will understand that the present invention can be implemented using bi-directional optical fibers, where each bi-directional optical fiber may simultaneously support both upstream and downstream transmissions. In that case, optical fibers 106 and 110 could be combined into a single bi-directional working fiber, and optical fibers 108 and 112 could be combined into a single bi-directional protection fiber.

Depending on the implementation, each of the incoming and outgoing customer signals may be transmitted between the corresponding node and the customer as either an optical signal or an electrical signal. For example, if a particular customer transmits and receives optical signals to and from Node 1, then Node 1 would be configured with (1) an optical-to-electrical converter (not shown in FIG. 1) to convert the incoming optical customer signal into an electrical customer signal (e.g., one of the eight incoming customer signals 114) and (2) an electrical-to-optical converter (not shown in FIG. 1) to convert an electrical customer signal (e.g., one of the eight outgoing customer signals 120) into the corresponding outgoing optical customer signal.

According to the present invention, each node in an optical communication network supports automatic provisioning of optical signals, where provisioning includes: (1) addition of a new optical signal, (2) deletion of an existing optical signal, (3) rate-upgrading of an existing optical signal, and (4) rate-downgrading of an existing optical signal. In the context of the particular embodiment shown in FIG. 1, this provisioning means that each of Nodes 1 and 2 is able to (1) add one or more new OC3 or OC12 signals to the corresponding OC48 signals, (2) remove one or more existing OC3 or OC12 signals from the corresponding OC48 signals, (3) rate-upgrade one or more existing OC3 signals to OC12 signals, and (4) rate-downgrade one or more existing OC12 signals to OC3 signals.

Of course, these different types of provisioning are subject to certain constraints, including the number of input/output ports in each node (i.e., no more than a total of eight OC3/OC12 signals at a time for the implementation shown in FIG. 1) as well as the inherent capacity of an OC48 signal. Together these two constraints limit the combination of OC3/OC12 signals into a single OC48 signal to the following scenarios:

(A) No OC12 signals and up to eight OC3 signals;
(B) One OC12 signal and up to seven OC3 signals;
(C) Two OC12 signals and up to six OC3 signals;
(D) Three OC12 signals and up to four OC3 signals; and
(E) Four OC12 signals.

Scenarios (A), (B), and (C) are limited by the particular number of available I/O ports (i.e., eight), while Scenarios (D) and (E) are limited by the finite capacity of OC48 signals. Those skilled in the art will understand that, in theory, as many as sixteen different OC3 signals can be packed into as single OC48 signal. The limitation of eight OC3 signals in Scenario (A), for example, is a function of the limited number of I/O ports (i.e., eight) rather than the inherent capacity of OC48 signals. In an alternative implementation having sixteen I/O ports, Scenario (A) could support up to sixteen OC3 signals, Scenario (B) could support up to twelve OC3 signals in addition to the one OC12 signal, and Scenario (C) could support up to eight OC3 signals in addition to the two OC12 signals.

The configuration shown in FIG. 1 is referred to as an "add/drop configuration," because each circuit board in this configuration supports both the adding (receipt) of incoming customer signals from the corresponding node's local customers as well as the dropping (transmission) of outgoing customer signals to the corresponding node's local customers. Another type of configuration supported by the present invention is the "drop/continue configuration," in which at least one of the circuit boards is capable of dropping one or more outgoing customer signals to the corresponding node's local customers, while acting as a conduit for passing one or more other customer signals from an upstream node to a downstream node. Note that, in a drop/continue configuration, a copy of each dropped signal is transmitted to the downstream node along with the "undropped" signals.

Figure 2:
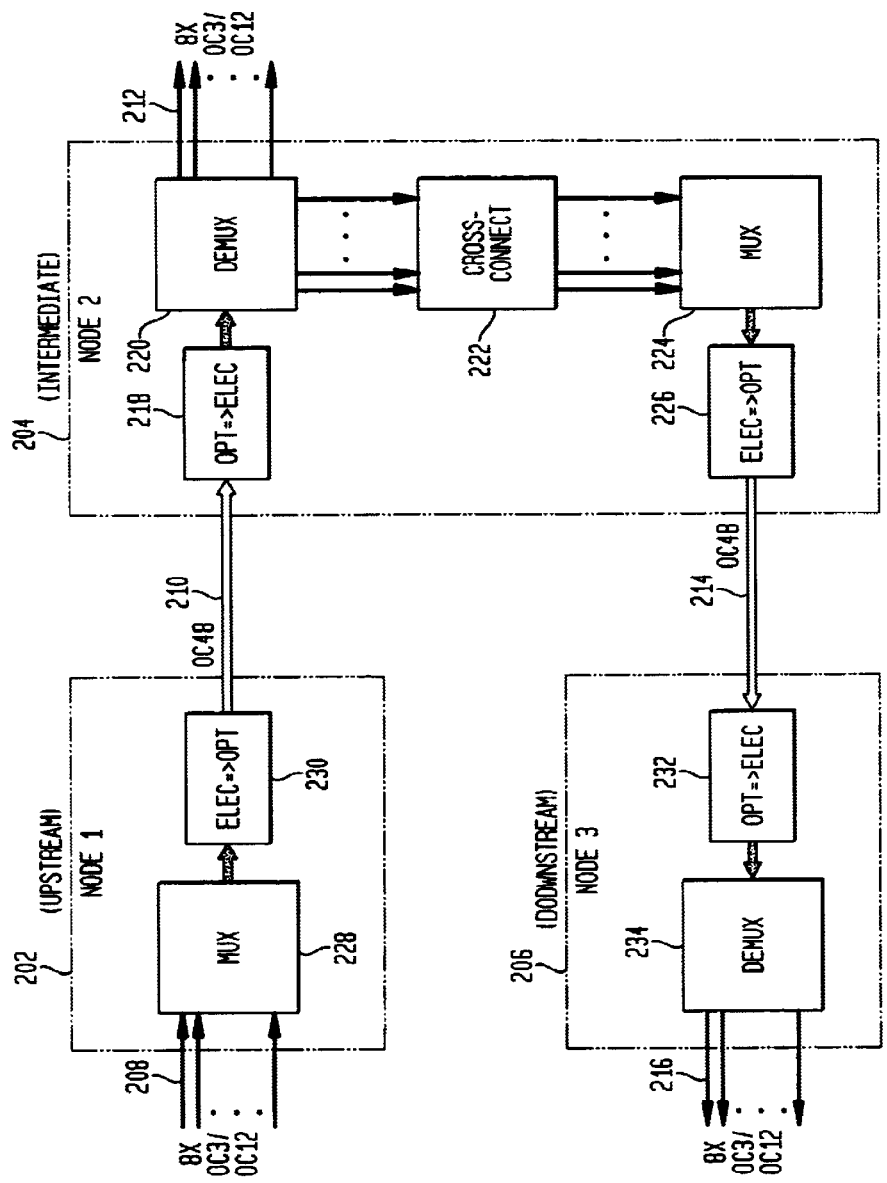
FIG. 2 shows a portion of an optical communication network having a drop/continue configuration, according to an alternative embodiment of the present invention.

FIG. 2 shows a portion of an optical communication network having a drop/continue configuration, according to an alternative embodiment of the present invention. In particular, FIG. 2 shows three nodes—upstream Node 1 202, intermediate Node 2 204, and downstream Node 3 206. In general, upstream Node 1 combines up to eight different OC3/OC12-rate incoming customer signals 208 for transmission as a single OC48 optical signal over downstream optical fiber 210 to intermediate Node 2. Node 2 drops copies of zero, one, or more (and up to all eight) of the OC3/OC12-rate signals 212 as outgoing customer signals to its local customers, while continuing to transmit all of the OC3/OC12-rate signals as a single downstream OC48 signal over optical fiber 214 to downstream Node 3, which drops zero, one, or more or the OC3/OC12-rate signals 216 as outgoing customer signals to its local customers.

To support this functionality, Node 2 has (A) an optical-to-electrical converter 218, (B) a circuit board comprising a demux 220, a cross-connect 222, and a mux 224, and (C) an electrical-to-optical converter 226. Optical-to-electrical converter 218 converts the OC48 optical signal received from Node 1 over fiber 210 into an OC48-rate electrical signal. Demux 220 separates the OC48-rate signal into its constituent OC3/OC12-rate signals and drops copies of the zero, one, or more OC3/OC12-rate signals 212 to Node 2's local customers. Cross-connect 222 forwards all of the OC3/OC12-rate signals from demux 220 to mux 224, which combines those OC3/OC12-rate signals into a second OC48-rate electrical signal. Electrical-to-optical converter 226 then converts the second OC48-rate electrical signal into the OC48 optical signal transmitted to Node 3 over fiber 214.

Similarly, Node 1 has a mux 228 and an electrical-to-optical converter 230 and Node 3 has an optical-to-electrical converter 232 and a demux 234, all of which provide functionality analogous to that provided by the corresponding components in Node 2.

For simplicity, the configuration of FIG. 2 is shown without any fault protection, although such fault protection, e.g., analogous to the 1+1 protection scheme shown in FIG. 1, may be implemented. Moreover, Nodes 1, 2, and 3 would typically be configured with analogous, "reciprocal" sets of components to support corresponding upstream communications. In other words, Node 3 would have a mux board similar to that shown in FIG. 2 for Node 1, Node 1 would have a demux board similar to that shown in FIG. 2 for Node 3, and Node 2 would have a second mux/demux board configured to (A) drop zero, one, or more OC3/OC12-rate electrical signals from an OC48-rate electrical signal corresponding to an incoming OC48 optical signal received from the mux board of Node 3 and (B) combine the OC3/OC12-rate electrical signals into an OC48-rate electrical signal for conversion and transmission as an outgoing OC48 optical signal transmitted to the demux board of Node 1.

The present invention may also be applied to other configurations, including add/drop/continue configurations in which an intermediate node has at least one circuit board that support the adding and dropping of one or more customer signals from and to the corresponding node's local customers as well as the continuation of one or more other signals between two other nodes (i.e., an upstream node and a downstream node).

As in the add/drop configuration of FIG. 1, according to the present invention, each of the circuit boards shown in the drop/continue configuration of FIG. 2, or any other suitable configuration, preferably supports all four types of provisioning of optical signals (i.e., addition, deletion, rate-upgrade, and rate-downgrade). The following description describes the signal provisioning processing implemented in the context of the add/drop configuration of FIG. 1. The same or analogous processing would be implemented for other configurations, including the drop/continue configuration of FIG. 2. Note that, in the drop/continue configuration of FIG. 2, the preferred automatic signal provisioning of the present invention is performed for the upstream "add" Node 1 and the downstream "drop" Node 3 only, and not for the intermediate "drop/continue" Node 2, which is transparent to map messages between the upstream and downstream nodes.

Overview of Provisioning Procedures

FIG. 3 shows a high-level diagram of a conventional OC48 frame, consisting of an OC48 frame header followed by 16 STS3 time slots. According to the SONET protocol, an OC3 signal can be positioned within an OC48 signal at any one of the sixteen different STS3 time slots within the format of the OC48 frame. In theory, an OC12 signal can be positioned within an OC48 signal at any four consecutive STS3 time slots within the OC48 frame. For purposes of this specification, the term "quad" is used to refer to four consecutive STS3 time slots in the OC48 frame. Since there are four consecutive STS3 time slots in a quad and sixteen STS3 time slots in the OC48 frame, there are thirteen different possible positions for a quad in an OC48 frame, where, for example, the $1^{st}$ quad starts at the $1^{st}$ STS3 time slot and ends at the $4^{th}$ STS3 time slot, and the $13^{th}$ quad starts at the $13^{th}$ STS3 time slot and ends at the $16^{th}$ STS3 time slot.

Depending on the existing mix of OC3 and OC12 signals and their currently assigned time slots within the OC48 frame, provisioning a new OC12 signal or rate-upgrading an existing OC3 signal to an OC12 signal may first require one or more existing OC3/OC12 signals to be moved around within the OC48 frame (i.e., switching from old time slots to new time slots) to accommodate the new OC12 signal. The nodes of the present invention are configured to support such functionality as part of their automatic provisioning capabilities.

Figure 4:
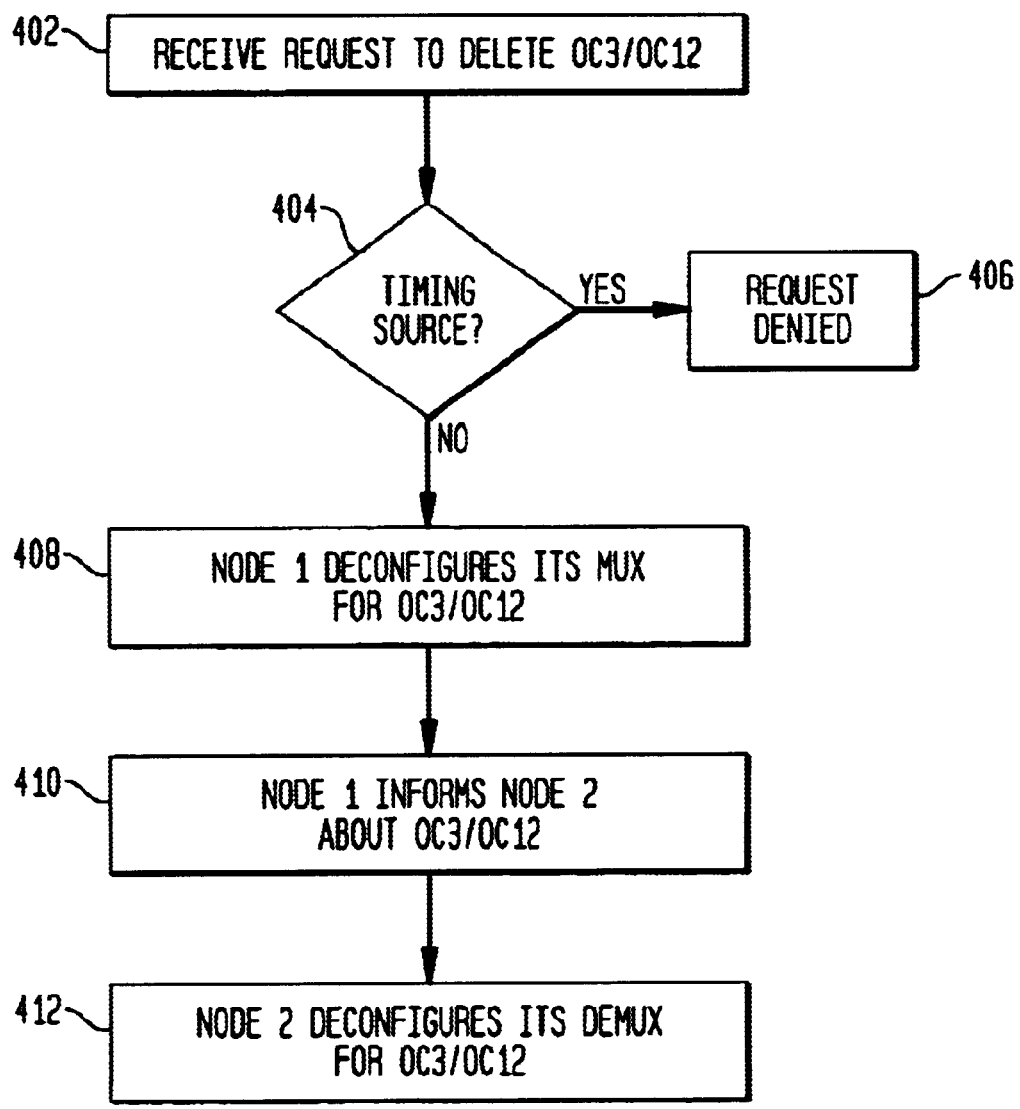
FIG. 4 shows a flow diagram of the provisioning processing implemented by Nodes 1 and 2 of FIG. 1 to delete an existing downstream OC3 or OC12 signal.

FIG. 4 shows a flow diagram of the provisioning processing implemented by Nodes 1 and 2 of FIG. 1 to delete an existing downstream OC3 or OC12 signal for a particular pair of circuit boards within Nodes 1 and 2. Node 1 receives a request from one of its local customers to delete an existing OC3/OC12 signal (step 402 of FIG. 4). According to preferred embodiments of the present invention, provisioning processing is not permitted to delete a customer signal if that signal is used to recover the clock that is currently selected as the working clock for muxing within the node. As such, if the signal to be deleted is the current mux timing source (step 404), then the request is denied and the provisioning processing terminates with a failure (step 406). Otherwise, the signal to be deleted is not the current mux timing source and the provisioning processing continues to step 408.

In step 408, Node 1 configures the mux of the corresponding circuit board to stop combining the existing OC3/OC12 signal into the corresponding OC48 signal. In addition (i.e., at the same time or just after or just before), Node 1 informs Node 2 about the deletion of the existing OC3/OC12 signal (step 410) and, in response, Node 2 "deconfigures" the demux of its corresponding circuit board to stop handling that signal (step 412).

In preferred embodiments of the present invention, signaling between Node 1 and Node 2 (e.g., step 410 in FIG. 4) is implemented using in-band optical signaling using selected header fields within the OC48 frame (e.g., a dedicated data communication channel defined in the re-mapped Transport Overhead (TOH) of the OC48 signal), although out-of-band optical or electrical signaling could be used in other embodiments. Moreover, each command preferably relies on full duplex handshaking involving three messages, where a transmitting node transmits an original command message (message #1) to a receiving node, the receiving node echoes the received command message (message #2) back to the transmitting node, which then compares the echoed command message with its original command message. If the original and echoed command messages match, then the transmitting node transmits an execute message (message #3), which authorizes the receiving node to proceed to implement the previously received command message.

Figure 5:
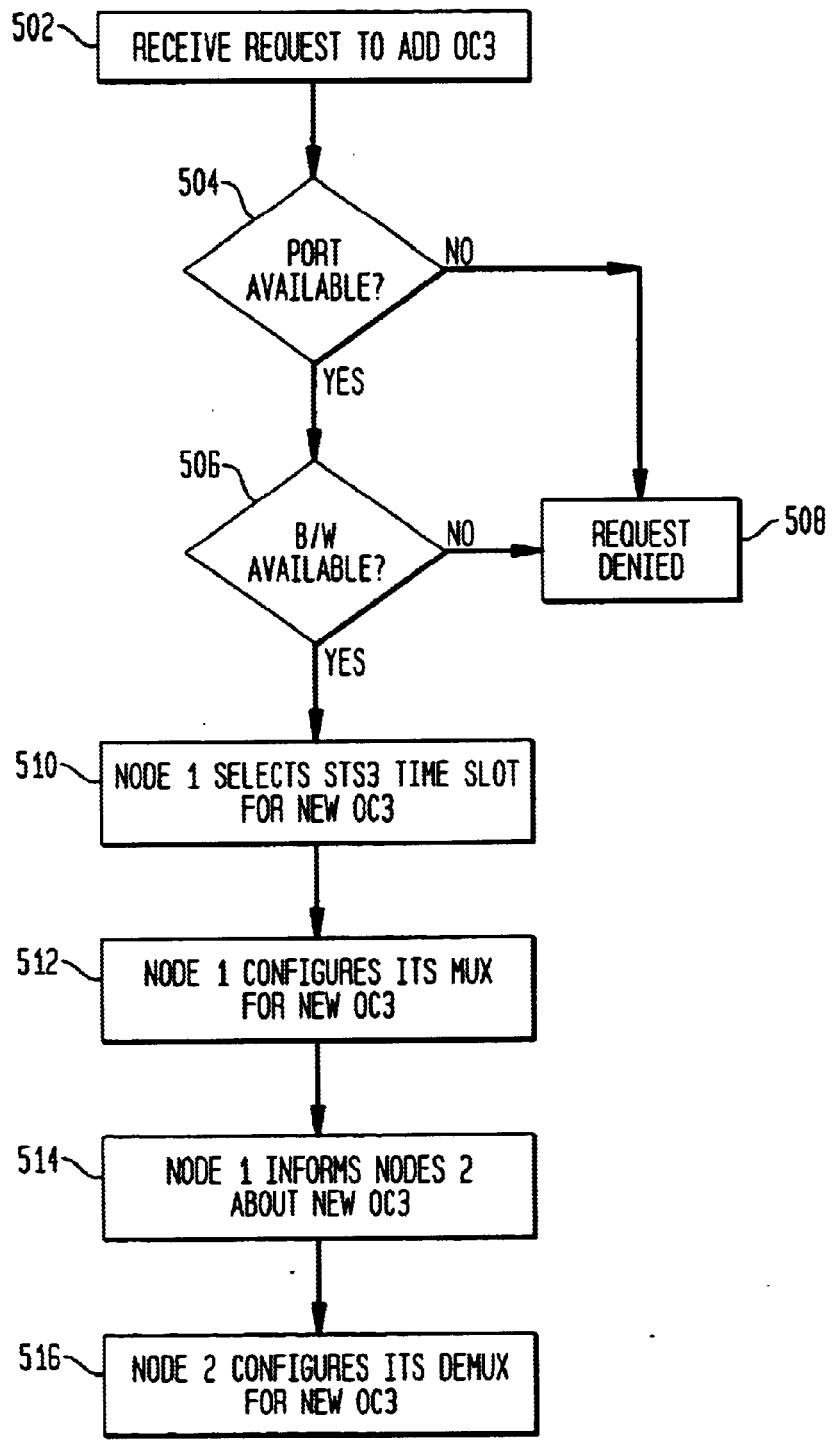
FIG. 5 shows a flow diagram of the provisioning processing implemented by Nodes 1 and 2 of FIG. 1 to add a new downstream OC3 signal.

FIG. 5 shows a flow diagram of the provisioning processing implemented by Nodes 1 and 2 of FIG. 1 to add a new downstream OC3 signal for a particular pair of circuit boards within Nodes 1 and 2. Node 1 receives a request from one of its local customers to add the new OC3 signal (step 502 of FIG. 5). If Node 1 determines that (1) an I/O port is not available on the corresponding circuit board (step 504) or (2) bandwidth is not available within the corresponding OC48 signal (step 506), then the request is denied and the provisioning processing terminates with a failure (step 508). Otherwise, Node 1 selects an available STS3 time slot within the OC48 frame for the new OC3 signal (step 510) and configures the mux of the corresponding circuit board to start combining the new OC3 signal into the corresponding OC48 signal (step 512). In addition, Node 1 informs Node 2 about the selected time slot for the new OC3 signal (step 514) and, in response, Node 2 configures the demux of its corresponding circuit board for the new OC3 signal (step 516).

In a preferred embodiment, in step 510, Node 1 searches for the most isolated, empty STS3 time slot to which to map the new OC3 signal. The "most isolated time slot" refers to a time slot where the distance (in number of used STS3 time slots) to the closest empty STS3 time slot to the left and to the right is maximized. The motivation for this search criterion is to reduce the chances of subsequently having to move that OC3 signal again in order to make room for a new or upgraded OC12 signal.

Figure 6:
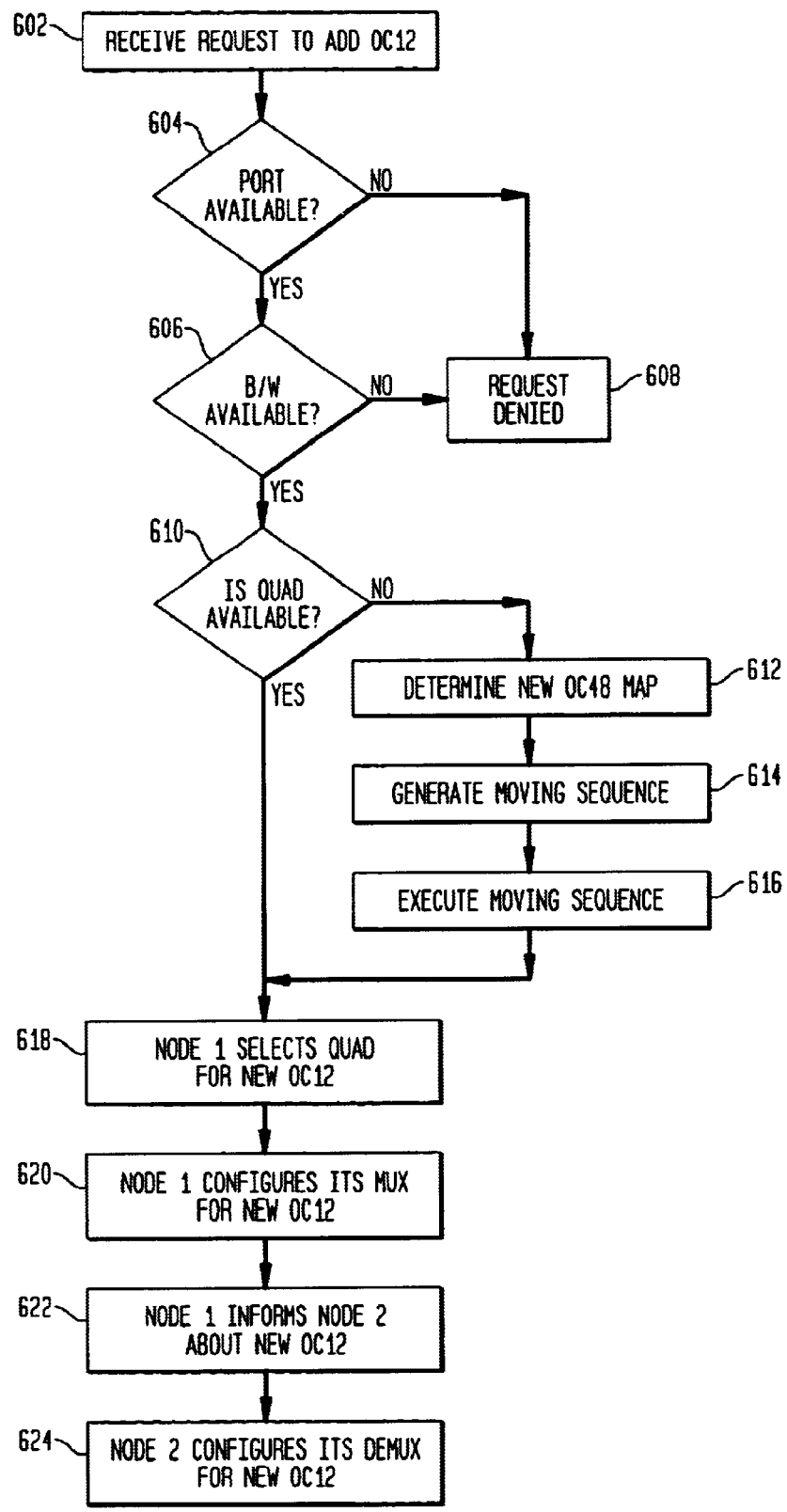
FIG. 6 shows a flow diagram of the provisioning processing implemented by Nodes 1 and 2 of FIG. 1 to add a new downstream OC12 signal.

FIG. 6 shows a flow diagram of the provisioning processing implemented by Nodes 1 and 2 of FIG. 1 to add a new downstream OC12 signal for a particular pair of circuit boards within Nodes 1 and 2. Node 1 receives a request from one of its local customers to add the new OC12 signal (step 602 of FIG. 6). If Node 1 determines that (1) an I/O port is not available on the corresponding circuit board (step 604) or (2) bandwidth is not available within the corresponding OC48 signal (step 606), then the request is denied and the provisioning processing terminates with a failure (step 608).

Otherwise, Node 1 determines whether a quad (i.e., a set of four consecutive STS3 time slots) is available in the OC48 frame for the new OC12 signal (step 610). A quad will be available if all four corresponding STS3 time slots are available. If a quad is available, then the provisioning processing continues directly to step 618.

If, however, a quad is not available, then Mode 1 performs suitable operations to make a quad available. These operations will involve moving one or more existing OC3/OC12 signals to different positions within the OC48 frame to change from an old OC48 map to a new OC48 map, where a map refers to the relationship between each OC3/OC12 input port and the position of the corresponding OC3/OC12 signal in the OC48 frame. This process of making a quad available involves three steps 612, 614, and 616.

During step 612, a re-map algorithm (described later in the specification in conjunction with FIG. 9) is executed to determine a preferred new map for the OC48 frame with new positions for one or more of the existing OC3/OC12 signals within the OC48 frame that would make a quad available for the new OC12 signal.

Step 614 generates a sequence of map changes (e.g., moving one or more of the existing OC3/OC12 signals to new positions within the OC48 frame) that would reconfigure the OC48 frame from the old map to the new map determined during the first phase. This step is discussed in further detail later in the specification after the description of FIG. 9 and before the description of FIG. 10.

Step 616 executes the sequence of map changes generated during step 614. This processing is described later in the specification in conjunction with FIG. 10.

At the completion of steps 612-616, the OC48 frame will be configured in the new map with an empty quad available for the new OC12 signal, and processing continues to step 618.

At step 618, Node 1 selects the quad for the new OC12 signal, and then configures its mux for the new OC12 signal (step 620). In addition, Node 1 informs Node 2 about the selected quad for the new OC12 signal (step 622) and, in response, Node 2 configures the demux of its corresponding circuit board for the new OC12 signal (step 624).

Figure 7:
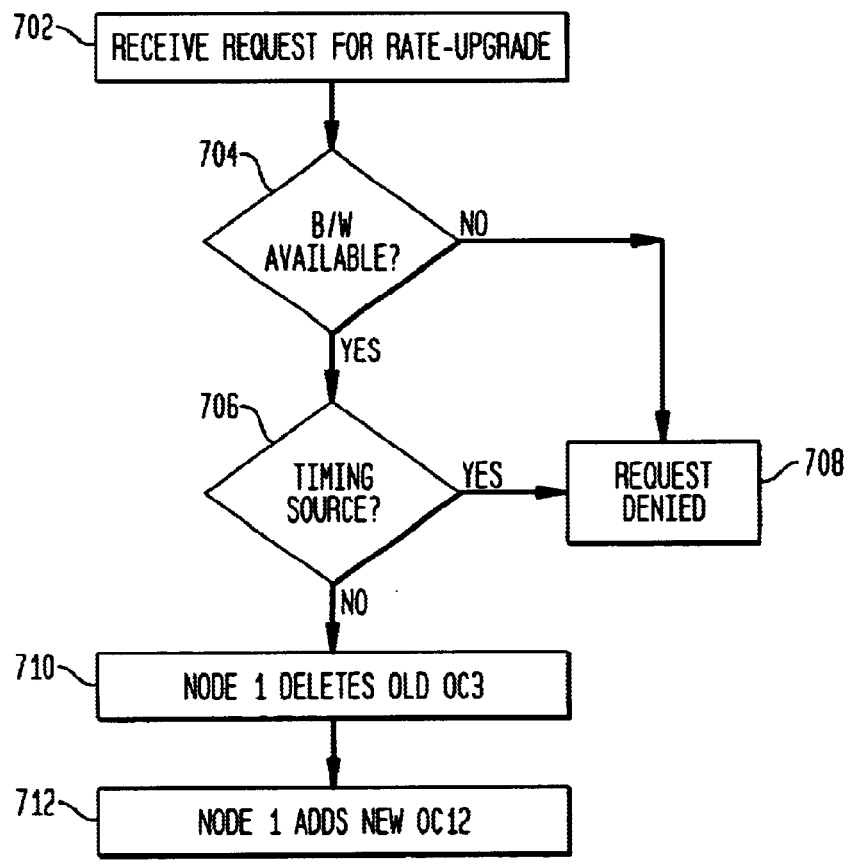
FIG. 7 shows a flow diagram of the provisioning processing implemented by Nodes 1 and 2 of FIG. 1 to upgrade an existing downstream OC3 signal to a new downstream OC12 signal.

FIG. 7 shows a flow diagram of the provisioning processing implemented by Nodes 1 and 2 of FIG. 1 to upgrade an existing downstream OC3 signal to a new downstream OC12 signal for a particular pair of circuit boards within Nodes 1 and 2. Node 1 receives a request from one of its local customers to rate-upgrade an existing OC3 signal (step 702 of FIG. 7). If Node 1 determines that bandwidth is not available within the corresponding OC48 signal (step 704) or if the existing OC3 signal is the current mux timing source (step 706), then the request is denied and the provisioning processing terminates with a failure (step 708). There will be available bandwidth for the rate-upgrade if there is a total of at least three available STS3 time slots somewhere in the OC48 frame. Note that the provisioning processing of FIG. 7 does not need to check whether a port is available, since it is assumed that the same port for the existing OC3 signal will be used for the new OC12 signal.

If there is available bandwidth for the rate-upgrade and the existing OC3 signal is not the current mux timing source, then the existing OC3 signal is deleted (step 710), e.g., using the provisioning procedure of FIG. 4, and the new OC12 signal is then added (step 712), e.g., using the provisioning processing of FIG. 6.

Figure 8:
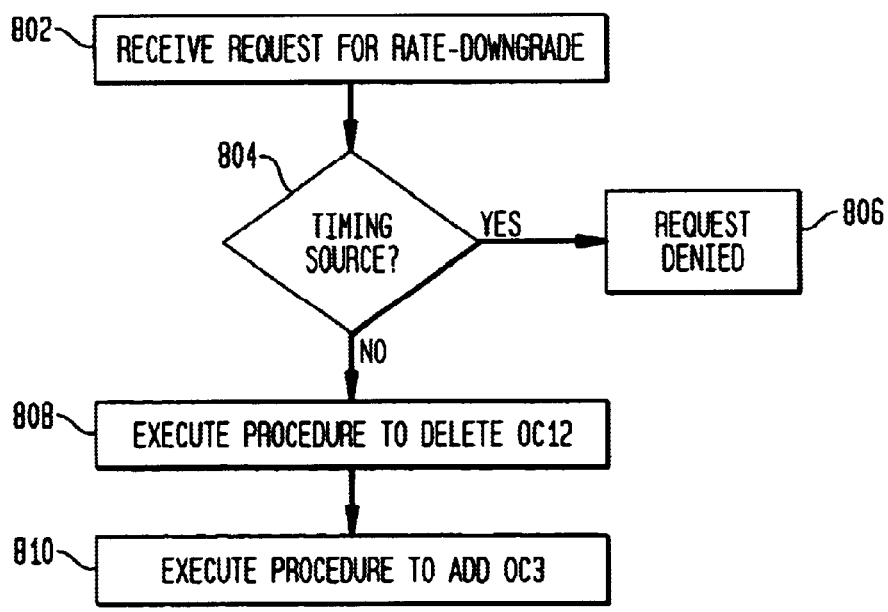
FIG. 8 shows a flow diagram of the provisioning processing implemented by Nodes 1 and 2 of 10 FIG. 1 to downgrade an existing downstream OC12 signal to a new downstream OC3 signal.

FIG. 8 shows a flow diagram of the provisioning processing implemented by Nodes 1 and 2 of FIG. 1 to downgrade an existing downstream OC12 signal to a new downstream OC3 signal for a particular pair of circuit boards within Nodes 1 and 2. Node 1 receives a request from one of its local customers to rate-downgrade an existing OC12 signal (step 802 of FIG. 8). If the existing OC12 signal is the current mux timing source (step 804), then the request is denied and the provisioning processing terminates with a failure (step 806). Otherwise, the existing OC12 signal is deleted (step 808), e.g., using the provisioning procedure of FIG. 4, and the new OC3 signal is then added (step 810), e.g., using the provisioning procedure of FIG. 5.

FIGS. 4–8 show processing involved in the four different types of provisioning for downstream signals transmitted from Node 1 to Node 2 in FIG. 1. Those skilled in the art will understand that Nodes 1 and 2 are capable of implementing analogous processing to perform the four different types of provisioning for upstream signals transmitted from Node 2 to Node 1. It will be further understood that, in general, for every provisioning of a downstream signal, reciprocal provisioning processing will be implemented (either simultaneously or consecutively) to perform similar provisioning of a corresponding upstream signal.

The provisioning processing of the present invention proposes a complete error-free solution for automatic off-line and in-line provisioning to add/delete/rate-upgrade/rate-downgrade OC3/OC12 signals in a bi-directional transmission in a TDM or DWDM network. To make user-provisioning in the muxing node independent of the provisioning in the demuxing node, according to certain embodiments of the present invention, two provisioning commands are preferably executed: one in the muxing node and another (an identical one) in the demuxing node. Execution of the two identical commands allows detection of user data entry errors. Each command gives the port number and bit-rate of the provisioned signal. Before executing the provisioning processing, the OC48 optical signals in both directions should be active and have no outstanding alarms.

Figure 9A:
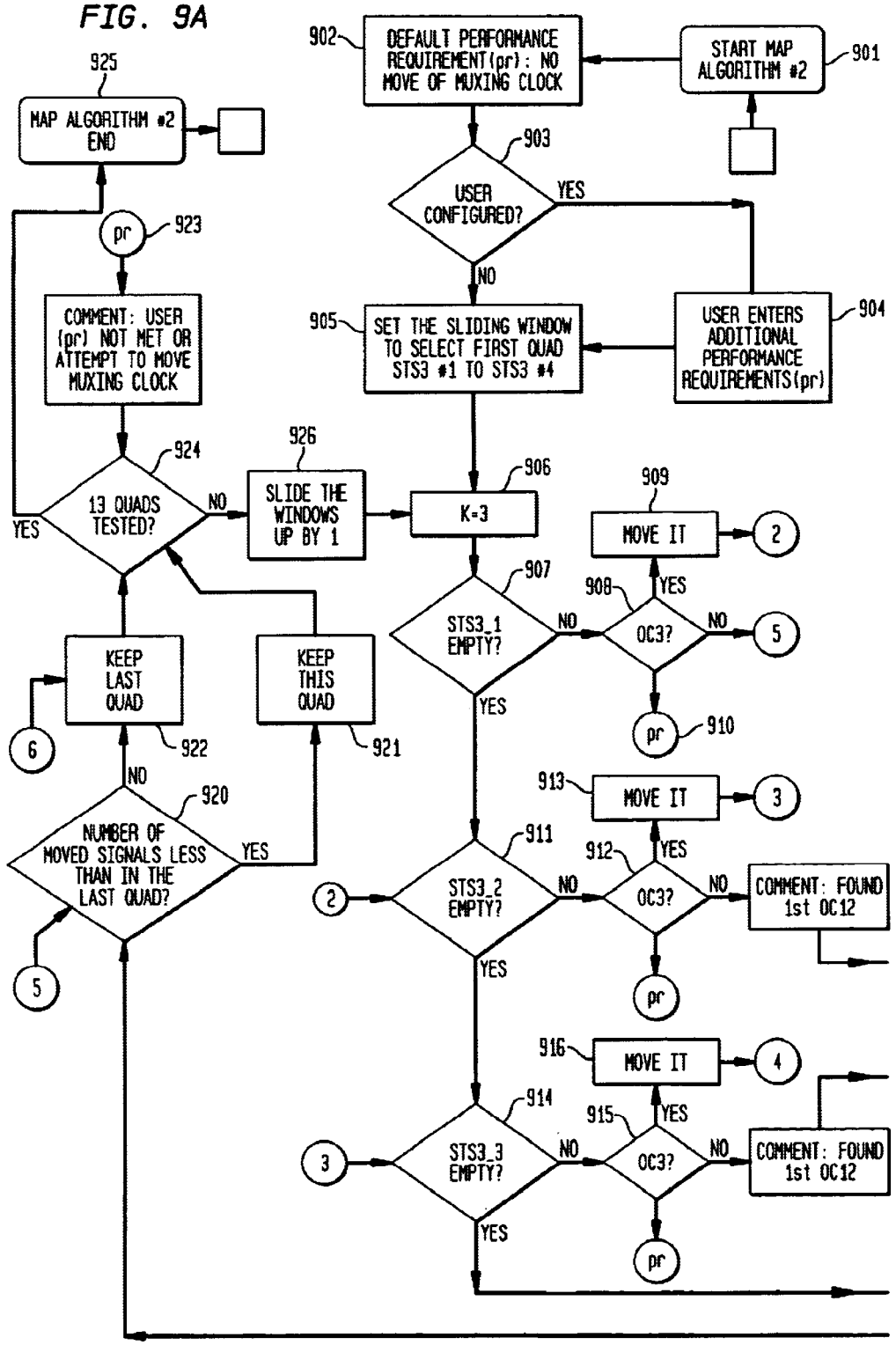
FIG. 9 shows a flow diagram of re-map processing implemented to determine a new map for an OC48 frame when a new OC12 signal needs to be added to an existing (i.e., old) map, according to one embodiment of the present invention.
Figure 9B:
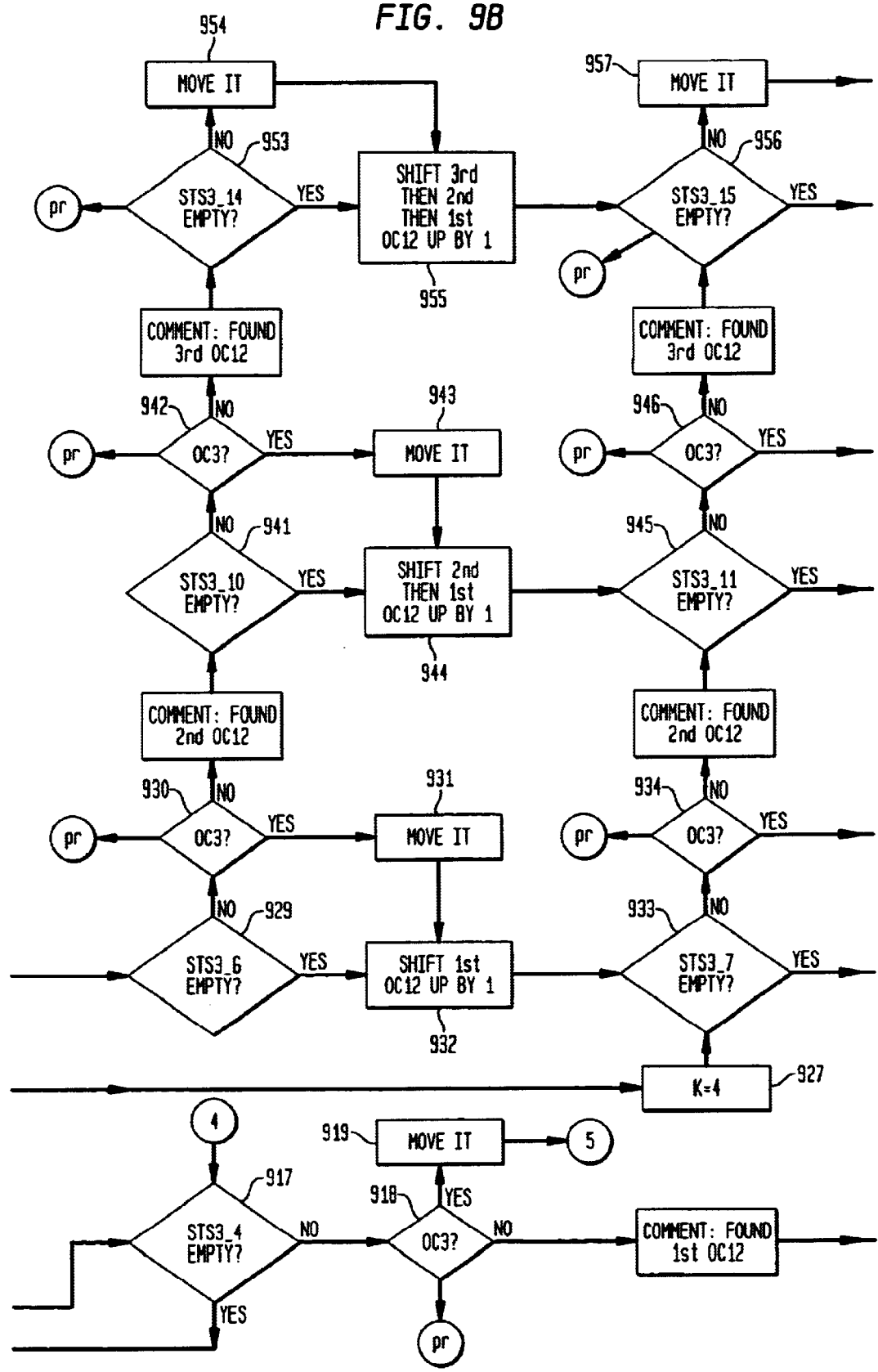
Figure 9C:
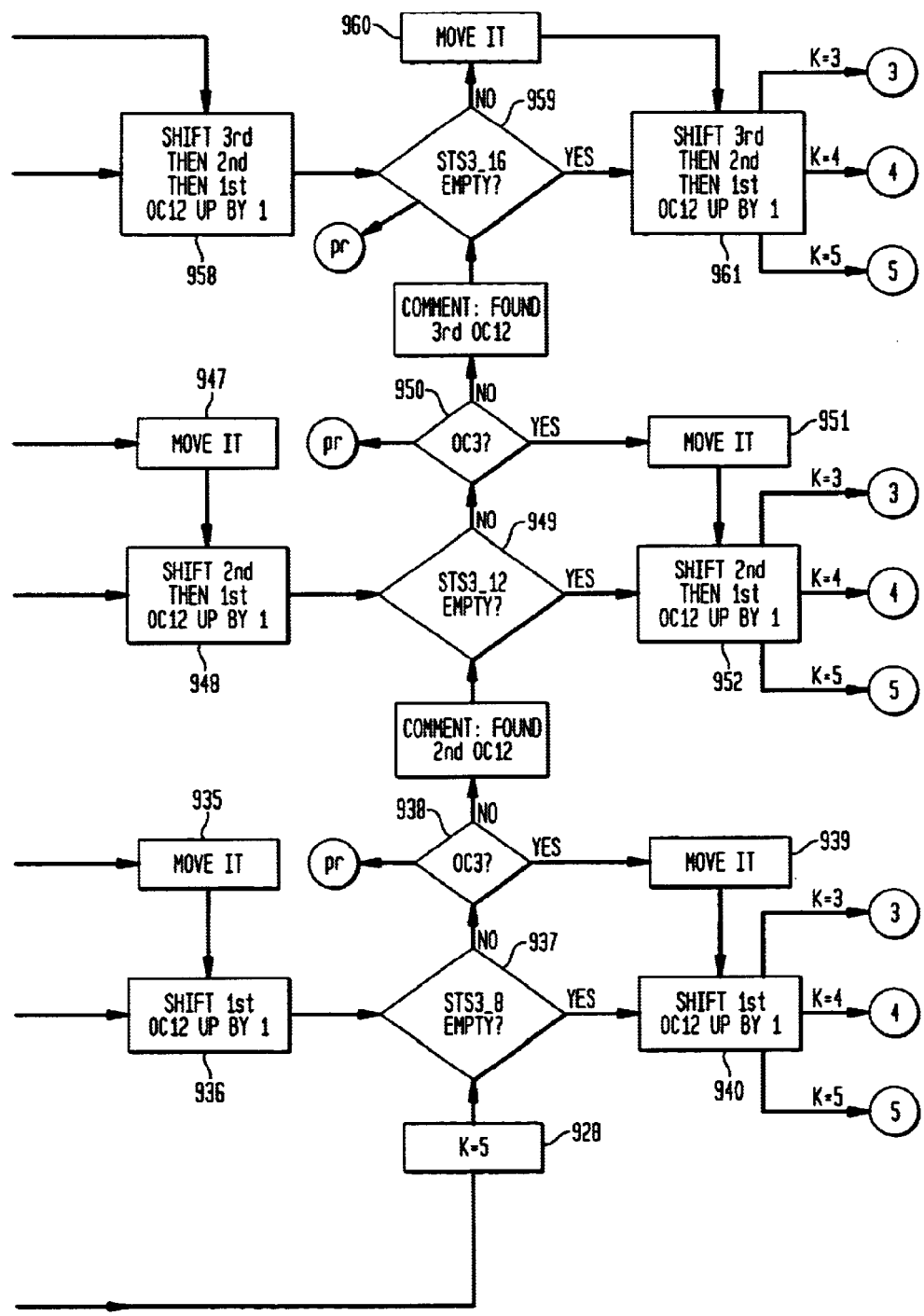

FIG. 9 shows a flow diagram of the re-map processing of step 612 of FIG. 6 implemented to determine a new map for the OC48 frame when a new OC12 signal needs to be added to an existing (i.e., old) map, according to one embodiment of the present invention. The processing of FIG. 9 is based on a number of operating constraints. One of these constraints is that, if an OC3/OC12 signal needs to be moved, it will be moved to a position later in the OC48 frame (i.e., to higher numbered STS3 time slots). Another constraint is that, if an OC3 signal needs to be moved, it will be moved to the most isolated, empty STS3 time slot in the OC48 frame. In some implementations, OC3 signals may be moved only to STS3 time slots that are later in the OC48 frame, although this constraint may be relaxed in other implementations. Yet another constraint is that the re-map processing selects a map that requires the minimum number of signals to be moved in order to minimize the impact to existing customers. The re-map processing has the additional constraint of not being permitted to move a signal that is used as the timing source for muxing. In alternative embodiments of the present invention, one or more of the operating principles may be relaxed or replaced by other criteria. For example, rather than minimizing the number of signals moved, the re-map processing may simply select the new map based on the first available quad. Note that the re-map processing of FIG. 9 does not move any existing signals; it merely determines a preferred new map for the OC48 frame that has a quad available for the new OC12 signal.

The re-map processing of FIG. 9 implements a time-slot-mapping algorithm to determine an optimum port-number-to-STS3-time-slot map for the new OC48 signal, where "optimum" means that a minimum number of live (i.e., existing) signals have to be re-mapped to different STS3 time slot(s) in the new map. Re-mapping may be needed to free four consecutive STS3 time slots (i.e., a quad) in order to add a new OC12 signal or to rate-upgrade an existing OC3 signal to an OC12 signal.

The re-map processing of FIG. 9 uses a sliding window corresponding to a quad (i.e., four consecutive STS3 time slots). The re-map processing iteratively moves the sliding window, one STS3 time slot at a time, from the first quad (corresponding to the $1^{st}$ through $4^{th}$ STS3 time slots in FIG. 3) to the thirteenth quad (corresponding to the $13^{th}$ through $16^{th}$ STS3 time slots in FIG. 3). At each position of the sliding window, the re-map processing determines whether the corresponding quad is a candidate for the quad to be used for the new OC12 signal. If an existing OC12 signal is already positioned at the corresponding quad, then that quad is rejected as a candidate quad for the new OC12 signal, since it would not make sense to move an existing OC12 signal out of a quad in order to position the new OC12 signal at that same quad. Similarly, if the corresponding quad is already empty, then it will be as good a candidate for the new OC12 signal as any other quad, since no existing signals will need to be moved to add the new OC12 signal. This case is essentially handled by step 610 of FIG. 6.

If the current quad does not contain an entire OC12 signal and is not empty, then the re-map processing determines where to move the OC3 signals that are in the current quad and/or the OC12 signals that overlap with the current quad to make that quad available. In order to move the OC3/OC12 signals from the current quad, it may first be necessary to move one or more OC3/OC12 signals that are outside of the current quad. The re-map processing of FIG. 9 handles those cases.

At each iteration, the re-map processing determines whether the current quad should be retained as the best quad so far (i.e., based on minimizing the total number of signals that need to be moved to make the current quad available for the new OC12 signal). At the end of the $13^{th}$ iteration (i.e., after testing all 13 quads), the re-map processing of FIG. 9 will have identified an optimal quad to make available for the new OC12 signal as well as a new mapping for the existing OC3/OC12 signals that leaves that optimal quad empty.

In FIG. 9, the STS3 time slots are numbered from STS3_1 through STS3_16, where STS3_1 corresponds to the first STS3 time slot relative to the current position of the sliding window. When the sliding window is positioned at the $1^{st}$ STS3 time slot, STS3_1 corresponds to the $1^{st}$ STS3 time slot and STS3_16 corresponds to the $16^{th}$ STS3 time slot. When the sliding window is positioned at the $2^{nd}$ STS3 time slot, however, STS3_1 corresponds to the $2^{nd}$ STS3 time slot, STS3_15 corresponds to the $16^{th}$ STS3 time slot, and STS3_16 has no meaning.

In FIG. 9, "move it" indicates execution of processing to find the most isolated, empty STS3 time slot later in the OC48 frame to which to move a live OC3 signal. An exit through "pr" indicates a failure to meet at least one of the specified performance requirements (e.g., moving more than allowed number of OC3/OC12 signals, moving signals not allowed to be moved as specified by the user, or attempting to move the current mux timing source).

In particular, the re-map processing of FIG. 9 starts at step 901. At step 902, the constraint of not being able to move an OC3/OC12 signal that is the current mux timing source is set as the default performance requirement (pr). If the system allows a user to add further performance requirements (step 903), then the user optionally adds additional performance requirements (e.g., a maximum number of signals that the re-map processing is allowed to move and/or which specific signals can or cannot be moved) (step 904).

The sliding window is then set to select the first quad (i.e., corresponding to the $1^{st}$ through $4^{th}$ STS3 time slots of FIG. 3) (step 905) and a jump indicator K is set to 3 (step 906). The jump indicator K is used to determine the destination during conditional branching that occurs towards the end of the flow diagram (i.e., following steps 940, 952, and 961).

If STS3_1 is not empty (step 907), then the re-map processing determines whether the existing signal in STS3_1 is an OC3 signal (as opposed to part of an OC12 signal) (step 908). If so, then the re-map processing executes the "move it" processing to identify an empty STS3 time slot to which to move the existing OC3 signal in STS3_1 (step 909) and the re-map processing jumps to processing node #2 to test STS3_2. If the signal in STS3_1 is not an OC3 signal (step 908), then it is an OC12 signal occupying the current quad (i.e., STS3_1 through STS3_4). If the current quad already has an OC12 signal, it would not make sense to move that existing OC12 signal and the current quad is not retained as a candidate for the new OC12 signal. In that case, the re-map processing jumps to processing node #6 to keep the previously retained quad (i.e., from a previous iteration) (step 922) before moving to test for the next iteration (step 924).

Note that, during step 908 (and all similar steps in FIG. 9 that determine whether a particular existing signal in a particular STS3 time slot is an OC3 signal), the re-map processing determines whether or not moving that existing signal violates one of the performance requirements (pr). If so, then, whether or not the existing signal is an OC3 signal, processing jumps from a "pr source" node (e.g., node 910) to "pr destination" node 923 to test the next quad (if any) in the OC48 frame at step 924.

The re-map processing performs processing analogous to steps 907–909 for other STS3 time slots to (1) determine whether the STS3 time slot is empty, (2) if not, determine whether the existing signal is an OC3, and (3) if so, move the existing OC3 signal to another STS3 time slot.

In particular, if the re-map processing moves an existing OC3 signal from STS3_2 (steps 911, 912, and 913), then the re-map processing jumps to processing node #3 to test $STS3_{13}$ 3. If the existing signal in STS3_2 is not an OC3 signal (steps 911 and 912), then the first OC12 signal has been found and processing continues to step 929 to test STS3_6. If STS3_2 is empty (step 911), then processing continues to step 914 to test STS3_3.

If the re-map processing moves an existing OC3 signal from STS3 3 (steps 914, 915, and 916), then the re-map processing jumps to processing node #4 to test STS3_4. If the existing signal in STS3_3 is not an OC3 signal (steps 914 and 915), then the first OC12 signal has been found, the jump indicator K is set to 4 (step 927), and processing continues to step 933 to test STS3_7. If STS3_3 is empty (step 914), then processing continues to step 917 to test STS3_4.

If the re-map processing moves an existing OC3 signal from STS3_4 (steps 917, 918, and 919), then the re-map processing jumps to processing node #5 and step 920. If the existing signal in STS3_4 is not an OC3 signal (steps 917 and 918), then the first OC12 signal has been found, the jump indicator K is set to 5 (step 928), and processing continues to step 937 to test STS3_8. If STS3_4 is empty (step 917), then processing continues to step 920.

At step 920, if the number of signals moved for the current quad is less than the number of signals moved for the best quad so far, then the current quad is retained as the best quad so far (step 921). Otherwise, the previously retained best quad is retained (step 922). In either case, if all 13 possible quads in the OC48 frame have been tested (step 924), then the re-map processing terminates with the retained best quad as the quad to be selected for the new or upgraded OC12 signal (along with a new map for the existing OC3/OC12 signals) (step 925). Otherwise, all 13 quads have not yet been tested (step 924), the sliding window is moved by one STS3 time slot (step 926), and processing returns to step 906 to test the new quad.

If STS3_6 is empty (step 929) or the re-map processing moves an existing OC3 signal from STS3_6 (steps 929, 930, and 931), then the re-map processing shifts the first OC12 signal (i.e., in STS3_2 through STS3_5) up by one STS3 time slot (i.e., to STS3_3 through STS3_6) (step 932) and then continues to step 933 to test STS3_7. If the existing signal in STS3_6 is not an OC3 signal (steps 929 and 930), then the second OC12 signal has been found and processing continues to step 941 to test STS3_10.

If STS3_7 is empty (step 933) or the re-map processing moves an existing OC3 signal from STS3_7 (steps 933, 934, and 935), then the re-map processing shifts the first OC12 signal (i.e., in STS3_3 through STS3_6) up by one STS3 time slot (i.e., to STS3_4 through STS3_7) (step 936) and then continues to step 937 to test STS3_8. If the existing signal in STS3_7 is not an OC3 signal (steps 933 and 934), then the second OC12 signal has been found and processing continues to step 945 to test STS3_11.

If STS3_8 is empty (step 937) or the re-map processing moves an existing OC3 signal from STS3_8 (steps 937, 938, and 939), then the re-map processing shifts the first OC12 signal (i.e., in STS3_4 through STS3_7) up by one STS3 time slot (i.e., to STS3_5 through STS3_8) (step 940) and then jumps to either processing node #3, #4, or #5 depending on the value of the jump indicator K. If the existing signal in STS3_8 is not an OC3 signal (steps 937 and 938), then the second OC12 signal has been found and processing continues to step 949 to test STS3_12.

If STS3_10 is empty (step 941) or the re-map processing moves an existing OC3 signal from STS3_10 (steps 941, 942, and 943), then the re-map processing shifts the second OC12 signal (i.e., in STS3_6 through STS3_9) up by one STS3 time slot (i.e., to STS3_7 through STS3_10), then shifts the first OC12 signal (i.e., in STS3_2 through STS3_5) up by one STS3 time slot (i.e., to STS3_3 through STS3_6) (step 944), and then continues to step 945 to test STS3_11. If the existing signal in STS3_10 is not an OC3 signal (steps 941 and 942), then the third OC12 signal has been found and processing continues to step 953 to test STS3_14.

If STS3_11 is empty (step 945) or the re-map processing moves an existing OC3 signal from STS3_11 (steps 945, 946, and 947), then the re-map processing shifts the second OC12 signal (i.e., in STS3_7 through STS3_10) up by one STS3 time slot (i.e., to STS3_8 through STS3_11), then shifts the first OC12 signal (i.e., in STS3_3 through STS3_6) up by one STS3 time slot (i.e., to STS3_4 through STS3_7) (step 948), and then continues to step 949 to test STS3_12. If the existing signal in STS3_11 is not an OC3 signal (steps 945 and 946), then the third OC12 signal has been found and processing continues to step 956 to test STS3_15.

If STS3_12 is empty (step 949) or the re-map processing moves an existing OC3 signal from STS3_12 (steps 949, 950, and 951), then the re-map processing shifts the second OC12 signal (i.e., in STS3_8 through STS3_11) up by one STS3 time slot (i.e., to STS3_9 through STS3_12), then shifts the first OC12 signal (i.e., in STS3_4 through STS3_7) up by one STS3 time slot (i.e., to STS3_5 through STS3_8) (step 952), and then jumps to either processing node #3, #4, or #5 depending on the value of the jump indicator K. If the existing signal in STS3_12 is not an OC3 signal (steps 949 and 950), then the third OC12 signal has been found and processing continues to step 959 to test STS3_16.

If STS3_14 is empty (step 953) or the re-map processing moves an existing OC3 signal from STS3_14 (steps 953 and 954), then the re-map processing shifts the third OC12 signal (i.e., in STS3_10 through STS3_13) up by one STS3 time slot (i.e., to STS3_11 through STS3_14), then shifts the second OC12 signal (i.e., in STS3_6 through STS3_9) up by one STS3 time slot (i.e., to STS3_7 through STS3_10), then shifts the first OC12 signal (i.e., in STS3_2 through STS3_5) up by one STS3 time slot (i.e., to STS3_3 through STS3_6) (step 955), and then continues to step 956 to test STS3_15.

If STS3_15 is empty (step 956) or the re-map processing moves an existing OC3 signal from STS3_15 (steps 956 and 957), then the re-map processing shifts the third OC12 signal (i.e., in STS3_11 through STS3_14) up by one STS3 time slot (i.e., to STS3_12 through STS3_15), then shifts the second OC12 signal (i.e., in STS3_7 through STS3_10) up by one STS3 time slot (i.e., to STS3_8 through STS3_11), then shifts the first OC12 signal (i.e., in STS3_3 through STS3_6) up by one STS3 time slot (i.e., to STS3_4 through STS3_7) (step 958), and then continues to step 959 to test STS3_16.

If STS3_16 is empty (step 959) or the re-map processing moves an existing OC3 signal from STS3_16 (steps 959 and 960), then the re-map processing shifts the third OC12 signal (i.e., in STS3_12 through STS3_15) up by one STS3 time slot (i.e., to STS3_13 through STS3_16), then shifts the second OC12 signal (i.e., in STS3_8 through STS3_11) up by one STS3 time slot (i.e., to STS3_9 through STS3_12), then shifts the first OC12 signal (i.e., in STS3_4 through STS3_7) up by one STS3 time slot (i.e., to STS3_5 through STS3_8) (step 961), and then jumps to either processing node #3, #4, or #5 depending on the value of the jump indicator K.

Since there are only 16 STS3 time slots, for positions of the sliding window beyond the $1^{st}$ STS3 time slot, the re-map processing of FIG. 9 is terminated when the end of the OC48 frame is reached. For example, when the sliding window is positioned at the $2^{nd}$ through $5^{th}$ STS3 time slots, STS_16 has no meaning and the re-map processing is terminated prior to reaching steps 959–961.

As described earlier, the re-map processing of FIG. 9 (i.e., step 612 of FIG. 6) determines an optimal new map for the existing OC3/OC12 signals that has a quad available for a new OC12 signal.

Step 614 of FIG. 6 generates a sequence of map changes to change the OC48 frame from the old map to the new map determined during step 612. Depending on the particular implementation, the process of generating the sequence of map changes of step 614 may or may not be based on the sequence of "simulated" moves generated during step 612 to determine the new map.

In general, the new map will differ from the old map in that one or more of the existing OC3/OC12 signals will be moved to new positions in order to provide an empty quad within the OC48 frame. There are a number of different algorithms for generating a sequence of map changes that would re-map the OC48 frame from the old map to the new map. Some of these algorithms may be based on one or more of the following principles.

Whenever possible, in order to minimize impact to existing customers, each move of an existing OC3/OC12 signal from an old position to a new position within the OC48 frame is implemented using a bridging and switching technique, in which transmission of the signal to be moved is initiated at the new position, while maintaining transmission of the signal at the old position, thereby double-casting the signal at both the old and new positions within the OC48 frame, after which transmission at the old position is then terminated. This is done using the multi-casting capability of the muxing node, which allows mapping of one signal to multiple STS3 time slots, thereby sending two copies of the same signal in different STS3 time slots.

Such double-casting assumes that the old and new positions do not overlap (i.e., that the old and new positions do not have any STS3 time slots in common). While this condition will necessarily always be satisfied when moving OC3 signals, there are certain maps where an OC12 signal cannot be moved using bridging and switching. For example, if the current OC48 frame format has three OC12 signals-called A, B, and C—positioned in three quads starting at the $3^{rd}$, $7^{th}$, and $11^{th}$ STS3 time slots, respectively, then bridging and switching cannot be performed to move each of signals A, B, and C in order to make a quad available to add a fourth OC12 signal D, because there are no two quads available for double-casting. In that case, at least one of the existing OC12 signals will have to be deleted from its old position before it can be transmitted at its new position. For example, signal C can be deleted, signal B can then be double-casted at the two quads starting at the $7^{th}$ and $13^{th}$ STS3 time slots to move signal B to the quad starting at the $13^{th}$ STS3 time slot, signal A can then be double-casted at the two quads starting at the $3^{rd}$ and $9^{th}$ STS3 time slots to move signal A to the quad starting at the $13^{th}$ STS3 time slot, signal C can then be re-added at either the quad starting at the $1^{st}$ STS3 time slot or the quad starting at the $4^{th}$ STS3 time slot. In either case, the other remaining quad will then be available for adding the new OC12 signal D. The processing of step 614 recognizes situations where bridging and switching cannot be performed and generates an appropriate sequence of map changes to achieve the desired new map during step 616. If, for performance reasons, bridging and switching is required for all signal moves, this requirement can be applied during the re-map algorithm of FIG. 9 to avoid selecting a new map that has any signal moves that cannot be implemented using bridging and switching.

Since, by design, the re-map algorithm of FIG. 9 selects a map corresponding to the minimal number of signals moved, each existing OC3 signal that gets moved, will be moved to an STS3 time slot that was already empty in the old map. In general, therefore, the sequence of map moves can start with all of the OC3 signal moves, if any, and then conclude with all of the OC12 signal map changes, if any, where those OC12 signal map changes may by one-map signal moves or, as discussed above, two-map signal deletes-and-adds, when bridging and switching cannot be performed.

Figure 10:
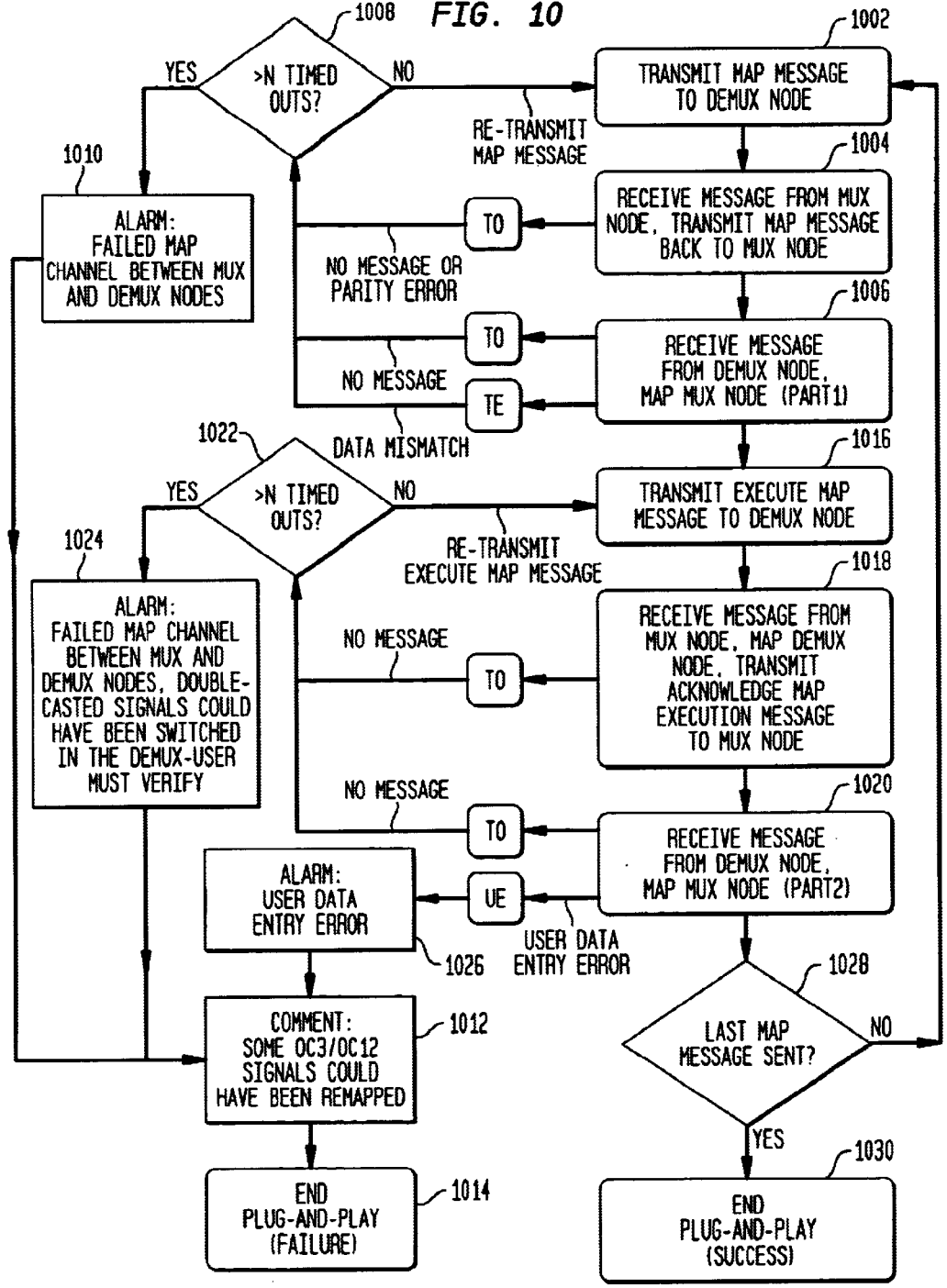
FIG. 10 shows the processing implemented to execute a sequence of map changes to re-map an OC48 frame from an old map to a new map to make a quad available for a new OC12 signal, according to one embodiment of the present invention.

FIG. 10 shows the processing implemented during step 616 of FIG. 6 to execute the sequence of map changes generated during step 614 to re-map the OC48 frame from the old map to the new map determined during step 612 to make a quad available for a new OC12 signal, according to one embodiment of the present invention. The processing of FIG. 10 is also implemented to add a new OC3 signal at an available STS3 time slot, to add a new OC12 signal to an available quad, or to delete an existing OC3/OC12 signal. The processing of FIG. 10 coordinates the execution of signal moves, additions, and/or deletions between the muxing node and the demuxing node. The processing of FIG. 10 executes a particular sequence of map changes corresponding to signal moves, additions, and/or deletions, one change at a time, from the first to the last map change in the sequence.

In FIG. 10, "to" indicates a time-out in the muxing node whenever the map message, or the execute map message or the acknowledge map execution message is not detected due to the transmission errors of the message flag (no message). When the demuxing node detects a parity error in the received message, it does not send the received message back to the muxing node, which results in a time-out by the muxing node indicated with the "to" symbol (parity error). "te" indicates detection of a transmission error when matching the information in the map transmitted by the muxing node and received from the demuxing node. "ue" indicates detection of a user data entry error either in the muxing node or in the demuxing node by matching the identical provisioning in the two nodes. This is done after confirmation of error-free transmission of the map.

In particular, for the current map change in the sequence, the muxing node transmits an appropriate map message (i.e., either an add map message, a delete map message, or a move map message) to the demuxing node and starts a mux time-out counter (step 1002 of FIG. 10). An add map message identifies the port # and STS3 time slot(s) for a new OC3/OC12 signal to be added to the OC48 frame. A delete map message identifies the port # and STS3 time slot for an existing OC3/OC12 signal to be deleted from the OC48 frame. A move map message identifies the port # and new STS3 time slot(s) for an existing OC3/OC12 signal to be moved to a new position within the OC48 frame.

The demuxing node receives the map message from the muxing node, checks the received map message for parity errors, and, if there are no parity errors, echoes the map message back to the muxing node and starts its own demux time-out counter (step 1004). The demuxing node also starts its own time out counter. If the demuxing node detects a parity error, then a transmission error (te) is detected and the demuxing node does nothing (i.e., it does not echo the map message back to the muxing node), which will eventually cause the muxing node to time out. Transmission errors could happen first on the way from the mux to the demux and later when sending the message back from the demux to the mux for matching to detect even parity errors. Odd parity checking in the demux detects the first error, but if the two errors cancel each other, then matching of transmitted and received messages in the mux will not detect the fact that the data received by the demux is errored. To avoid that, when an odd parity error is detected in the demux, the message is not sent back to time-out in the muxing node, thereby forcing re-transmission.

The muxing node receives the echoed map message from the demuxing node, compares the echoed map message to the original map message it sent to the demuxing node, and, if they match, executes Part 1 of the process of mapping the muxing node based on the original map message and transmits an execute map message to the demuxing node (step 1006). Part 1 of the mux mapping process is described later in the specification in conjunction with FIG. 11. If the echoed map message does not match the original map message, then a transmission error (te) is detected. If the mux time-out counter times out before the muxing node receives an echoed map message, then a time-out (to) is detected. In either case, an error counter is incremented and processing continues to step 1008.

If the error counter exceeds a specified threshold N (e.g., 10) (step 1008), then an alarm condition is signaled at the muxing node indicating that the current map change failed (step 1010). Note that the failure could have occurred after one or more map changes were successfully implemented, in which case, some OC3/OC12 signals may have already been re-mapped (i.e., moved, added, or deleted) (comment 1012) when the processing of FIG. 10 terminates in failure (step 1014). If the error counter does not exceed the specified threshold, then processing returns to step 1002, where the muxing node re-transmits the previous map message to the demuxing node to again attempt the same map change.

If there was no time out or transmission error, then processing continues to step 1016, where the muxing node transmits an execute map message to the demuxing node and restarts its mux time-out counter.

The demuxing node receives the execute map message from the muxing node, performs processing to map the demuxing node based on the original map message, and transmits a map execution message back to the muxing node (step 1018). The demuxing node compares the received port number and received number of consecutive time slots STS3 (1 or 4) with the port number and bit rate of the provisioned signal in the demuxing node. If they do not agree, the demuxing node sends a negative acknowledge map execution message to the muxing node to indicate a user data entry error, and if it is the move command, the demuxing node un-does the double-casting. If they agree, the demuxing node executes the add/delete/move STS3(s) map command based on the port number, number of consecutive time slots, and STS3 number information received in the message. Depending on the implementation, if the demuxing node detects a parity error in the execute map message received from the muxing node, the demuxing node does not transmit a map execution message back to the muxing node, causing the muxing node to time out and, depending on how many time-outs have occurred, re-transmit the execute map message. The demux mapping process is described later in the specification in conjunction with FIG. 12.

The muxing node receives the map execution message from the demuxing node and implements Part 2 of the mux mapping process (step 1020). Part 2 of the mux mapping process is described later in the specification in conjunction with FIG. 13. If the mux time-out counter times out before the muxing node receives a map execution message from the demuxing node, then a time-out (to) is detected at the mux. In that case, an error counter is incremented and compared to a specified time-out threshold N (e.g., 10) (step 1022). If the error counter exceeds the specified time-out threshold N, then an alarm condition is signaled at the muxing node, indicating that a map change failed (step 1024). As with the alarm condition of step 1010, the failure could have occurred after one or more map changes were successfully implemented, in which case, some OC3/OC12 signals may have already been remapped (i.e., moved, added, or deleted) (comment 1012) when the processing of FIG. 10 terminates in failure (step 1014). If the error counter does not exceed the specified threshold, then processing returns to step 1016, where the muxing node re-transmits the previous execute map message to the demux to again attempt to complete the same map change.

If the map execution message received by the muxing node is a negative map execution message, indicating that a user data entry error was detected at the demuxing node, then a user data entry error (ue) is detected at the mux, a corresponding alarm condition is signaled (step 1026), before terminating processing of the sequence of map changes in failure (step 1014).

If no time-outs or user data entry errors are detected, then processing continues to step 1028. If the last map message in the sequence of map changes has already by processed, then processing terminates (step 1030). Otherwise, processing returns to step 1002 to transmit the next map message in the sequence. The sending of a new map message and its execution in the muxing and the demuxing nodes is repeated until the processing of FIG. 10 completes implementation of the new map computed using the re-map processing of FIG. 9. An inability to distinguish between non-detection of the transmission-errored execution map message and the acknowledge map execution message would make it impossible to decide if the demuxing node executed or not the switch of the moved OC3/OC12 signal based on the time-out in the muxing node alone. To avoid failing the moved live signal, the muxing node does not perform un-doing of the double-casting. Instead, the failed processing generates an appropriate alarm message to the user to indicate the situation. To minimize the possibility of non-detection of the two messages, a strong error detection and correction capability is designed for them.

The map messages transmitted by the mux and demux use the following common messaging format. Each message is four bytes long, where byte 1 is a type-of-message flag, byte 2 is a first data byte, byte 3 is a second data byte, and byte 4 is a bitwise parity byte for bytes 1, 2, and 3. When messages are not sent, the idle channel byte "00000000" is inserted into the transmission channel.

The defined values for the type-of-message flag (byte 1) include the following (where "x" designates an undefined bit that can be either 0 or 1):

"11000xxx"—add map message

"11101xxx"—delete map message

"11111xxx"—move map message

"11110xxx"—execute map message

"11011xx1"—positive acknowledge execution of add/delete/move map

"11011xx0"—negative acknowledge execution of add/delete/move map

For the execute map message and the positive and negative acknowledge execution of add/delete/move map messages, bytes 2 and 3 are not defined.

For the add, delete, and move map messages, the first data byte (byte 2) has the format "011Fabcd", where F=1 means that an OC12 signal is added/deleted/moved, F=0 means that an OC3 signal is added/deleted/moved, and "abcd" identifies the port number for the OC3/OC12 signal that is added/deleted/moved.

The second data byte (byte 3) has the format "010Fefgh", where "F" has the same meanings as in the first data byte and "efgh" identifies the STS3 time slot number. For the add map message, "efgh" identifies the STS3 time slot for new OC3/OC12 signal. For the move map message, "efgh" identifies the STS3 time slot for the existing OC3/OC12 signal to be moved. For the delete map message, "efgh" is not really needed, since the demuxing node will be able to determine the STS3 time slot for the OC3/OC12 signal to be deleted, from the port number (i.e., "abcd" in byte 2).

Figure 11:
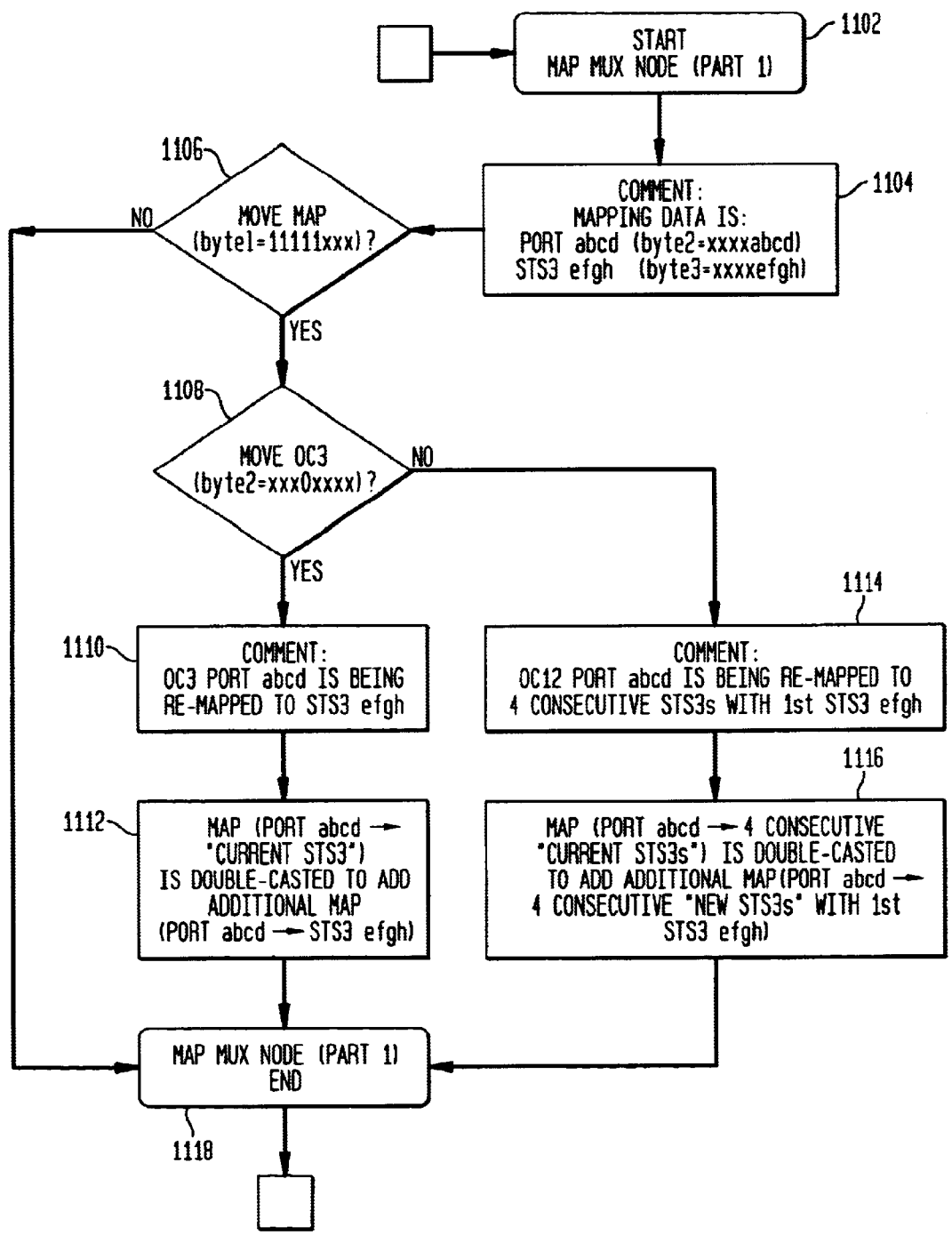
FIG. 11 shows a flow diagram of Part 1 of the process of mapping the muxing node, according to one embodiment of the present invention.

FIG. 11 shows a flow diagram of Part 1 of the process of mapping the muxing node based on the original map message corresponding to step 1006 of FIG. 10, according to one embodiment of the present invention. Part 1 corresponds to the initiation of double-casting for the bridging and switching of an existing OC3/OC12 signal to a new position within the OC48 frame.

In particular, the processing of FIG. 11 starts at step 1102 (after the muxing node receives an echoed map message that matches its original map message) with the original map message identifying the port (i.e., "abcd" in byte 2 of the map message) and, depending on the type of map message, the STS3 time slot (i.e., "efgh" in byte 3 of the map message) (comment 1104). If the map message is not a move map message (step 1106), then it is an add or delete map message, in which case double-casting is not needed and processing of Part 1 terminates (step 1118). If the map message is a move map message, then processing continues to step 1108, where it is determined whether the signal to be moved is an OC3 signal or an OC12 signal.

If the signal to be moved is an OC3 signal (step 1108), then the specified port is to be re-mapped from its current ("old") STS3 time slot to the specified new STS3 time slot (comment 1110) and double-casting is begun by mapping the port to the new STS3 time slot while maintaining the mapping of the port to the old STS3 time slot (step 1112), before terminating Part 1 at step 1118.

Otherwise, the signal to be moved is an OC12 signal (step 1108), the specified port is to be re-mapped to the new quad that begins at the specified STS3 time slot (comment 1114), and double-casting is begun by mapping the port to the new quad while maintaining the mapping of the port to the old quad (step 1116), before terminating Part 1 at step 1118.

Figure 12A:
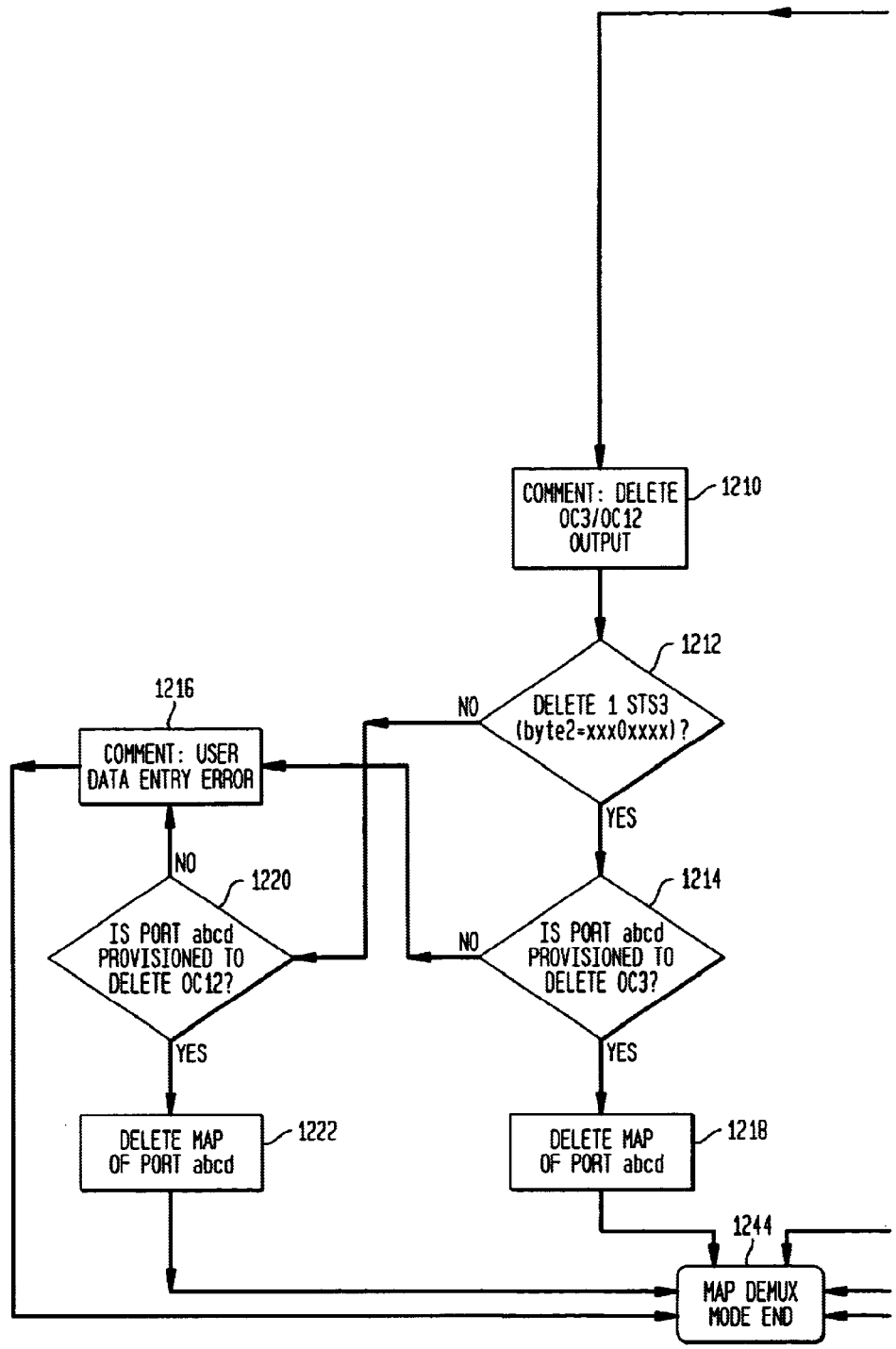
FIG. 12 shows a flow diagram of the process of mapping the demuxing node, according to one embodiment of the present invention.
Figure 12B:
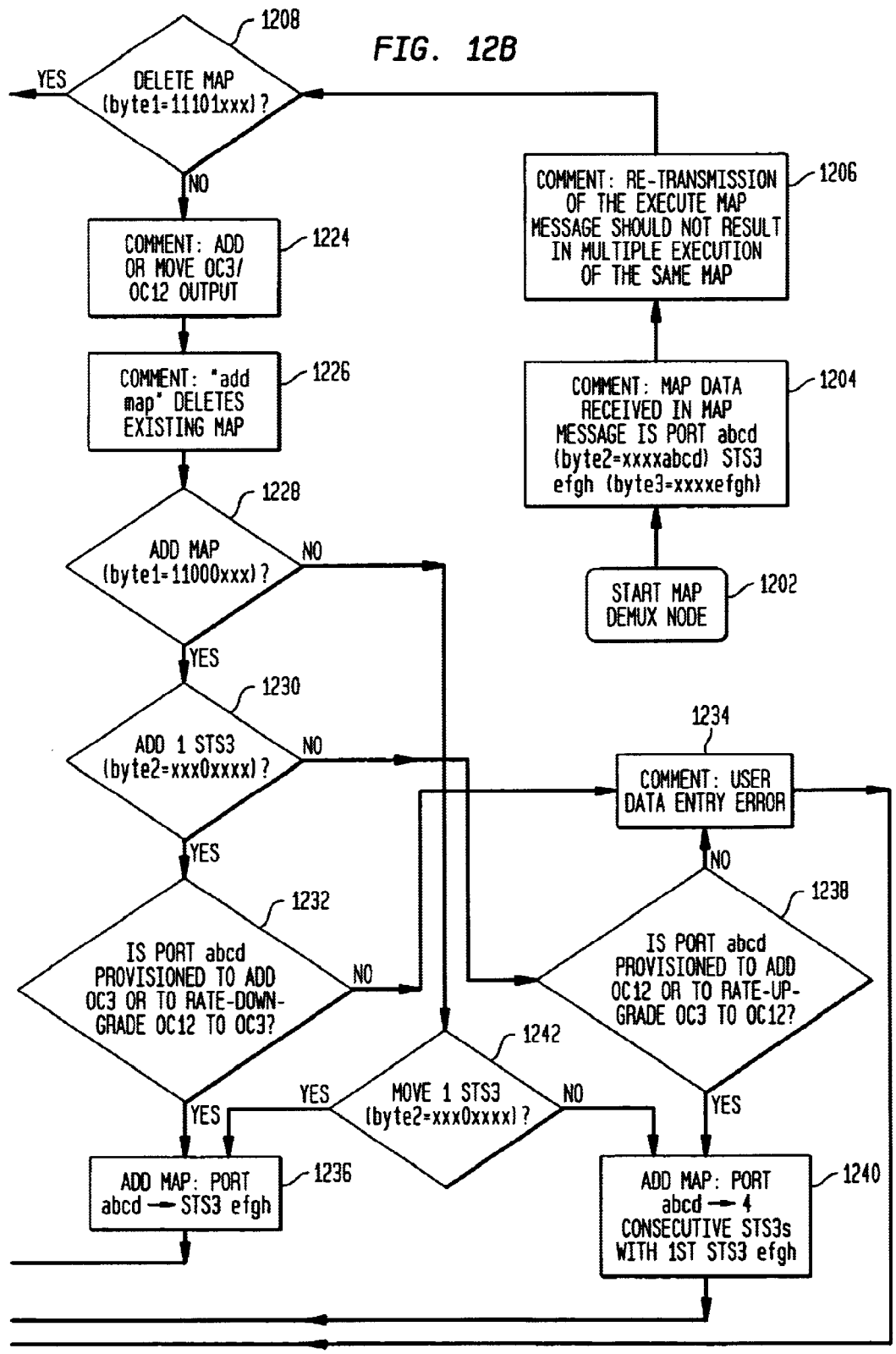

FIG. 12 shows a flow diagram of the process of mapping the demuxing node based on a received map message corresponding to step 1018 of FIG. 10, according to one embodiment of the present invention. The processing of FIG. 12 starts at step 1202 after the demuxing node receives an execute map message from the muxing node. The processing of FIG. 12 is based on information contained within the previously received original map message identifying the port and, depending on the type of map message, the STS3 time slot (comment 1204). Note that re-transmission of the execute map message by the muxing node should not result in multiple executions of the same original map message by the demuxing node (comment 1206).

If the original map message is a delete map message (step 1208), then the demuxing node is to delete the OC3/OC12 output (comment 1210). If the signal to be deleted is an OC3 signal (step 1212), but the demuxing node has not previously received an independent command to delete an OC3 signal on that same port (step 1214), then a user data entry error is detected (comment 1216) and the processing of FIG. 12 terminates without deleting the signal (step 1244). If, however, the signal to be deleted is an OC3signal (step 1212) and the demuxing node has previously received an independent command to delete an OC3 signal on that same port (step 1214), then the map for the specified port is deleted (step 1218) before processing terminates at step 1244.

Similarly, if the signal to be deleted is an OC12 signal (step 1212), but the demuxing node has not previously received an independent command to delete an OC12 signal on that same port (step 1220), then a user data entry error is detected (comment 1216) and the processing of FIG. 12 terminates without deleting the signal (step 1244). If, however, the signal to be deleted is an OC12 signal (step 1212) and the demuxing node has previously received an independent command to delete an OC12 signal on that same port (step 1220), then the map for the specified port is deleted (step 1222) before processing terminates at step 1244.

If the original map message is not a delete map message (step 1208), then it is either an add map message or a move map message (comment 1224). Note that an add map message deletes any existing map for the specified port (comment 1226). If the original map message is an add map message (step 1228), processing continues to step 1230, which determines whether the signal to be added is an OC3 signal or an OC12 signal.

If the signal to be added is an OC3 signal (step 1230), but the demuxing node has not previously received an independent command to add an OC3 signal or rate-downgrade an OC12 signal to an OC3 signal on that same port (step 1232), then a user data entry error is detected (comment 1234) and the processing of FIG. 12 terminates without adding the signal (step 1244). If, however, the signal to be added is an OC3 signal (step 1230) and the demuxing node has previously received an independent command to add an OC3 signal or rate-downgrade an OC12 signal to an OC3 signal on that same port (step 1232), then the specified port is mapped to the specified STS3 time slot (step 1236) before processing terminates at step 1244.

Similarly, if the signal to be added is an OC12 signal (step 1230), but the demuxing node has not previously received an independent command to add an OC12 signal or rate-upgrade an OC3 signal to an OC12 signal on that same port (step 1238), then a user data entry error is detected (comment 1234) and the processing of FIG. 12 terminates without adding the signal (step 1244). If, however, the signal to be added is an OC12 signal (step 1230) and the demuxing node has previously received an independent command to add an OC12 signal or rate-upgrade an OC3 signal to an OC12 signal on that same port (step 1238), then the specified port is mapped to the quad that starts at the specified STS3 time slot (step 1240) before processing terminates at step 1244.

If the original map message is not an add map message (step 1228), then it is a move map message and processing continues to step 1242, which determines whether the signal to be moved is an OC3 signal or an OC12 signal. If the signal to be moved is an OC3 signal (step 1242), then the port is mapped to the specified new STS3 time slot (step 1236) before processing terminates at step 1244. If the signal to be moved is an OC12 signal (step 1242), then the port is mapped to the quad that starts at the specified new STS3 time slot (step 1240) before processing terminates at step 1244.

FIG. 13 shows a flow diagram of Part 2 of the process of mapping the muxing node based on the original map message corresponding to step 1020 of FIG. 10, according to one embodiment of the present invention. Part 2 corresponds to the completion of the bridging and switching of an existing OC3/OC12 signal to a new position within the OC48 frame.

In particular, the processing of FIG. 13 begins at step 1302 after the muxing node receives an acknowledge map execution message from the demuxing node. If the muxing node received a negative acknowledge map execution message (step 1304), then the demuxing node detected a user data entry error during the processing of FIG. 12 (comment 1306), in which case, if appropriate, the muxing node deletes the new map created during the Part 1 processing of FIG. 11 corresponding to the initiation of double-casting (step 1308) and jumps to the "ue" node in FIG. 10 (step 1310).

Otherwise, the muxing node received a positive acknowledge map execution message (step 1304) and the original map message identifies the port number and, depending on the type of map message, the STS3 time slot (comment 1312) and processing continues to step 1314. If the map message is a move map message (step 1314) and the signal to be moved is an OC3 signal (step 1316), then the port is to be re-mapped to the specified new STS3 time slot (comment 1318). Note that, in this case, the port has already been mapped to double-cast the OC3 signal to both the old and new STS3 time slots as a result of Part 1 of FIG. 11. As such, when the map from the port to the old STS3 time slot is deleted (step 1320), the map from the port to the new STS3 time slot remains (comment 1322) when the processing of FIG. 13 terminates (step 1342).

If, however, the signal to be moved is an OC12 signal (step 1316), then the port is to be re-mapped to a new quad starting at the specified STS3 time slot (comment 1324). Note that, in this case, the port has already been mapped to double-cast the OC12 signal to both the old and new quads as a result of Part 1 of FIG. 11. As such, when the map from the port to the old quad is deleted (step 1326), the map from the port to the new quad remains (comment 1328) when the processing of FIG. 13 terminates (step 1342).

If, instead of being a move map message (step 1314), the map message is an add map message (step 1330), then any existing map for the specified port will be deleted (comment 1332). If the signal to be added is an OC3 signal (step 1334), then the specified port is mapped to the specified STS3 time slot (step 1336) before the processing of FIG. 13 terminates at step 1342. If, however, the signal to be added is an OC12 signal (step 1334), then the specified port is mapped to the quad that starts at the specified STS3 time slot (step 1338) before the processing of FIG. 13 terminates at step 1342.

Otherwise, the map message is a delete map message (step 1330) and the map of the specified port is deleted (step 1340) before the processing of FIG. 13 terminates at step 1342.

Figure 14:
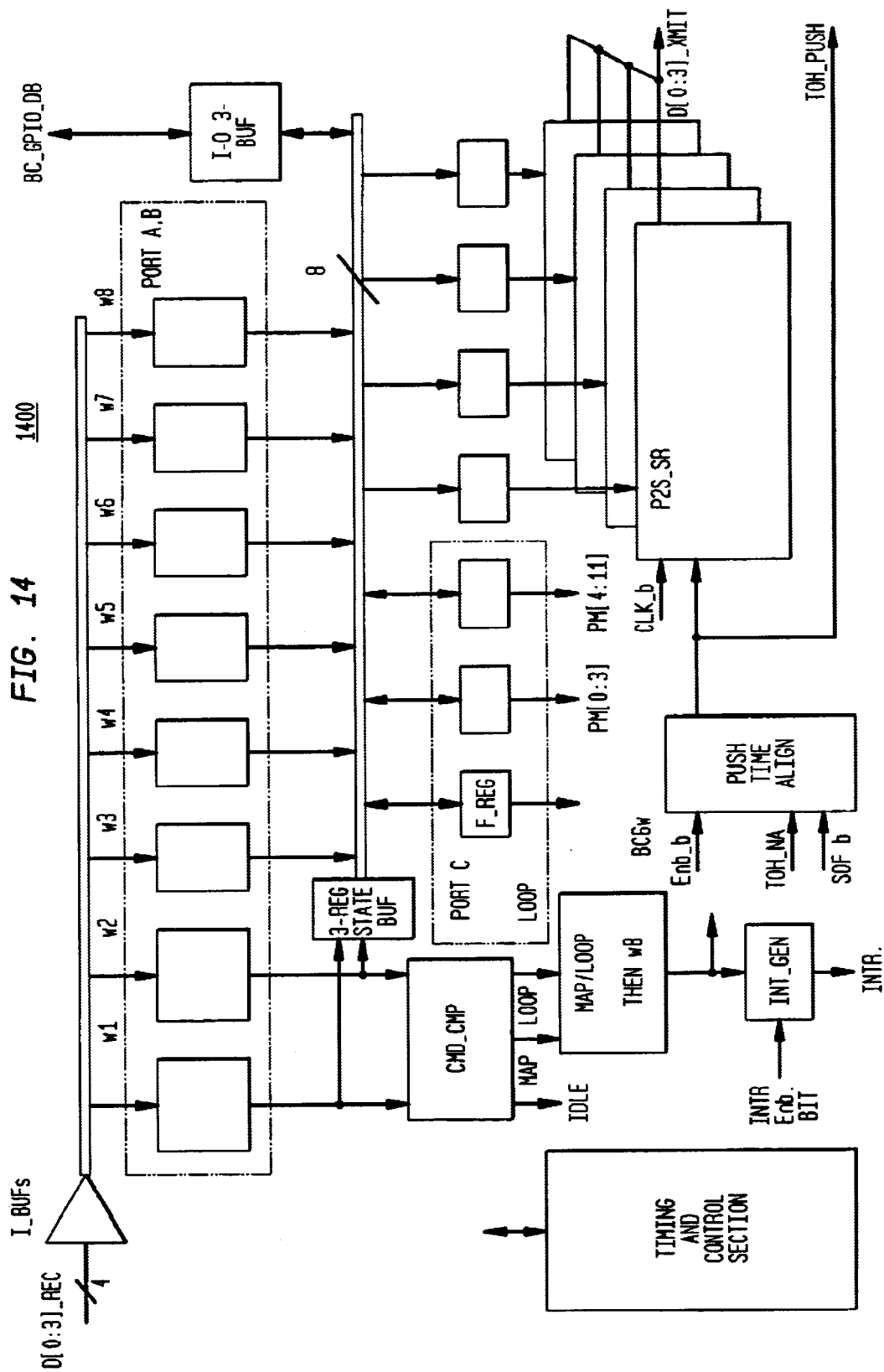
FIG. 14 shows a block diagram of an interface circuit that performs provisioning processing, according to one embodiment of the present invention.

FIG. 14 shows a block diagram of an interface circuit 1400 that performs the provisioning processing, according to one embodiment of the present invention. Interface circuit 1400 is preferably implemented on a field-programmable gate array (FPGA). After the configuration and initialization process, interface circuit 1400 functions as a three-port device (i.e., with Ports A, B, and C). Ports A and B are uni-directional interfaces to/from the SONET/SDH mux/demux device shown, for example, in FIG. 1. Each of Ports A and B comprise a uni-directional 4-bit data bus, 20.736-MHZ mux and demux clocks, 8-KHz Start Of Frame (SOF) pulses, and a TOH insert enable pulse. Port C is a bi-directional I/O port that interfaces interface circuit 1400 with the board controller (not shown), which initiates sending of a message by writing the message to interface circuit 1400. When interrupted by an interface circuit that detects the received message flag, the board controller reads the message from that interface circuit.

Features and options of interface circuit 1400 include:
- Serial clock and high-speed data interface to the TOH of the OC-48 SONET/SDH signal at the output from the SONET/SDH mux and at the input to the SONET/SDH demux.
- Insertion/extraction of n-bytes of information to/from the muxed/demuxed OC48 TOH for the purpose of off-line and in-line user provisioning to add/delete/rate-upgrade/rate-downgrade of mixed-rate OC-48 SONET/SDH signals.

TOH Message Extraction (TME) Interface from the demuxed OC48 signal.

TOH Message Insertion (TMI) Interface to the muxed OC48 signal.

Programmable in the TME and in the TMI message width.

Programmable in the TME and in the TMI placement of the message in the OC48 TOH.

Add/delete/rate-upgrade/rate-downgrade message monitoring and processing.

Parallel bi-directional asynchronous/synchronous interface to the board controller.

Generation of an interrupt to the board controller upon detection of a valid message.

Total read/write functionality from/to board controller.

Tri-stateable outputs for In-Circuit-Test (ICT), and net sharing.

Figure 15:
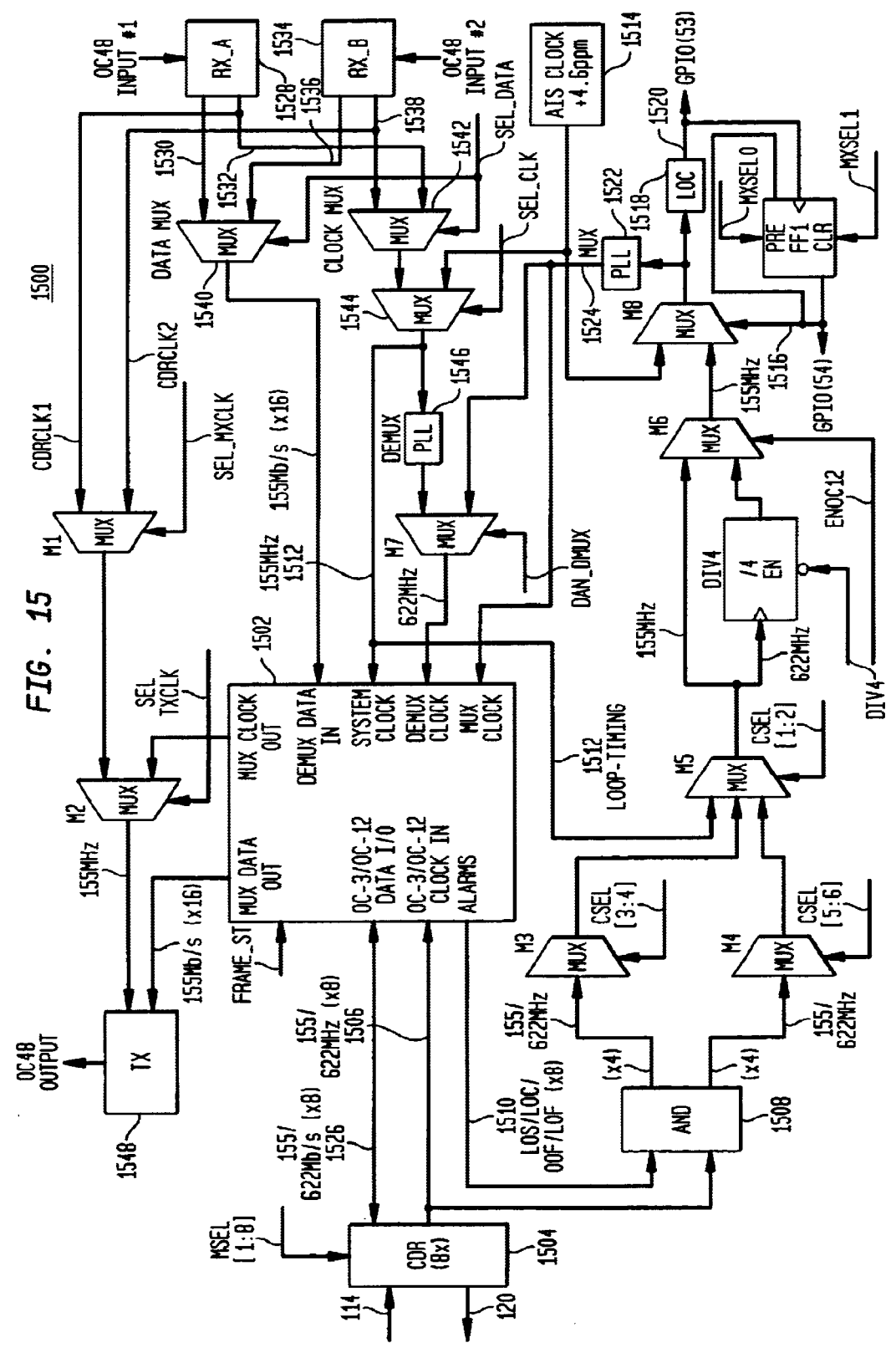

FIG. 15 shows a block diagram of muxing/demuxing circuit 1500 for the mux/demux board of Node 1 of FIG. 1, according to one embodiment of the present invention. Circuit 1500 receives up to eight OC3/OC12-rate incoming customer signals 114 and generates a corresponding OC48-rate output signal for splitting, conversion, and transmission over optical fibers 106 and 108 to Node 2. In addition, circuit 1500 receives the two copies of the OC48-rate signal (referred to in FIG. 15 as OC48 input #1 and OC48 input #2) received from Node 2 over optical fibers 110 and 112 and generates the (up to) eight corresponding OC3/OC12-rate outgoing customer signals 120. In addition, circuit 1500 receives various status and control signals from a board controller (not shown) that controls the operations of circuit 1500. At the heart of circuit 1500 is integrated circuitry 1502 that performs the muxing and demuxing operations.

To perform these functions, circuit 1500 generates up to 11 different clock signals: one clock from each of the up to eight different OC3/OC12-rate incoming customer signals 114, one clock from each copy of the OC48-rate signal, and a local clock (e.g., a Stratum-3 clock). Circuit 1500 can be configured for use in either the add/drop configuration of FIG. 1 or the drop/continue configuration of FIG. 2. When configured for use in an add/drop configuration, circuit 1500 selects and uses one of the 11 different clock signals for muxing, while demuxing is based on a clock selected from the two OC48-rate clocks and the local clock. When configured for use in a drop/continue configuration, there are no incoming customer signals. As such, both muxing and demuxing are based on the same clock selected from the two OC48-rate clocks and the local clock.

In particular, transceiver circuitry 1504 with appropriate clock-and-data-recovery (CDR) circuitry recovers the up to eight different customer signal clocks 1506 from the up to eight different OC3/OC12rate incoming customer signals 114. Customer signal clocks generated from OC3 signals have a clock rate of 155 MHZ, while customer signal clocks generated from OC12 signals have a clock rate of 622 MHZ. A control signal MSEL[1:8] from the board controller identifies which of the eight input ports of transceiver circuitry 1504 have live incoming customer signals.

The up to eight customer signal clocks 1506 are input to AND block 1508, which applies a logical "AND" operation between each customer signal clock 1506 and a corresponding alarm control signal 1510 that indicates whether the corresponding clock is valid. In particular, each of the eight alarm control signals 1510 will have a logical value of "1" if the corresponding customer signal clock 1506 is valid and a logical value of "0" if a loss-of-signal (LOS), a loss-of-clock (LOC), an out-of-frame (OOF), or a loss-of-frame (LOF) condition exists for that customer signal. One of the first four customer signal clocks from AND block 1508 is selected at mux M3 based on control signal CSEL[3:4], while one of the last four customer signal clocks is selected at mux M4 based on control signal CSEL[5:6].

These two selected customer signal clocks are then input to mux M5 along with a loop-timing clock 1512 (described below). Based on control signal CSEL[1:2], mux M5 selects one of these three clocks. Depending on whether the incoming customer signals are OC3 or OC12 signals and depending on which clocks are selected by muxes M3, M4, and M5, the clock selected by mux M5 may have a clock rate of either 155 MHZ or 622 MHZ. When enabled by control signal DIV4, divider DIV4 divides the clock from mux M5 by four, and mux M6 selects either the clock received directly from mux M5 or the divided clock from divider DIV4 based on control signal ENOC12. In particular, when the clock selected by mux M5 has a clock rate of 155 MHZ, then mux M6 selects the clock received directly from mux M5. When the clock selected by mux M5 has a clock rate of 622 MHZ, then mux M6 selects the divided clock from divider DIV4. In either case, the clock from mux M6 has a clock rate of 155 MHZ.

The 155-MHZ clock from mux M6 is input to mux M8 along with a 155-MHZ local clock from local clock generator 1514. Mux M8 selects one of these two clocks based on a control signal 1516 generated by flip-flop FFI. The clock from mux M8 is input to loss-of-clock (LOC) detector 1518, which monitors the clock from mux M8 to detect a loss-of-clock condition. LOC detector 1518 generates an LOC signal 1520, which is fed back to flip-flop FF1. In addition, LOC signal 1520 is transmitted to the board controller as GPIO(53), part of general purpose input/output. Control signal 1516 is also fed back to flip-flop FFI. Whenever LOC detector 1518 detects an LOC condition, LOC signal 1520 goes high, which causes flip-flop FF1 to toggle control signal 1516, thereby changing the selection made by mux M8 from one input to the other. Control signal 1516 is also transmitted to the board controller as part of GPIO, in particular, as GPIO(54). Flip-flop FF1 also receives preset and clear signals MXSEL0 and MXSEL1, respectively, from the board controller.

The 155-MHZ clock selected by mux M8 is also input to mux phase-locked loop (PLL) 1522, which multiplies the 155-MHZ clock by four to generate a 622-MHZ clock 1524, which is input to mux/demux circuitry 1502 for use as the muxing clock for muxing the recovered incoming customer data signals 1526 from transceiver circuitry 1504. The resulting muxed data signals are presented at the mux data output of mux/demux circuitry 1502 as 16 parallel 155-Mb/s data signals.

Meanwhile, OC48 input signal #1 is input to CDR circuit 1528, which recovers 16 parallel 155-Mb/s data signals 1530 and a single 155-MHZ clock (CDRCLK1) 1532. Similarly, OC48 input signal #2 is input to CDR circuit 1534, which recovers 16 parallel 155-Mb/s data signals 1536 and a single 155-MHZ (CDRCLK2) clock 1538. The two sets of data signals are input to data mux 1540, which selects one of the two sets based on control signal SEL_DATA as the data input for demuxing by mux/demux circuitry 1502.

The two 155-MHZ clocks 1532 and 1538 are input to clock mux 1542, which selects one of the two clocks based on control signal SEL_DATA. Muxes 1540 and 1542 are part of fault protection circuitry for circuit 1500 The clock selected by mux 1542 is input to mux 1544, which also receives the 155-MHZ local clock from local clock generator 1514. Based on control signals SEL_CLK, mux 1544 selects one of the two clocks as clock 1512. In addition to being input to mux M5 as the loop-timing clock (as described above), clock 1512 is input to mux/demux circuitry 1502 for use as the system clock. Clock 1512 is also input to demux PLL 1546, which multiplies 155-MHZ clock 1512 by four to generate a 622-MHZ clock.

The 622-MHZ clock from demux PLL 1546 is input to mux M7 along with the 622-MHZ clock 1524 from mux PLL 1522. Based on control signal DAN_DMUX, mux M7 selects one of the two clocks for use by mux/demux circuitry 1502 as the demux clock for demuxing the 16 parallel 155-Mb/s data signals from data mux 1540. When circuit 1500 is configured for use in an add/drop configuration, mux M7 is configured by control signal DAN_DMUX to always select the clock from demux PLL 1546. Alternatively, when circuit 1500 is configured for use in a drop/continue configuration, mux M7 is configured by control signal DAN_DMUX to always select clock 1524 from mux PLL 1522. In either case, the demuxed data signals generated by mux/demux circuitry 1502 are presented at the OC3/OC12 data I/O port of mux/demux circuitry 1502 as eight 155/622-Mb/s data signals and transmitted to transceiver circuitry 1504 as part of bi-directional signals 1526 for transmission to the appropriate customers as outgoing OC3/OC12-rate customer signals.

The CDRCLK1 and CDRCLK2 clocks 1532 and 1538 are also input to mux M1, which selects one of the two 155-MHZ clocks based on control signal SEL_MXCLK. The clock from mux M1 is input to mux M2 along with the 155-MHZ mux clock from mux/demux circuitry 1502. This mux clock is the same clock input to mux/demux circuitry 1502 from mux PLL 1522. Based on control signal SEL_TXCLK, mux M2 selects one of the two 155-MHZ clocks for use by transmitter 1548 in transmitting the 16 parallel 155-Mb/s data signals generated by mux/demux circuitry 1502 as a single OC48-rate output signal.

Circuit 1500 provides a reliable, high-performance solution for timing of boards designed for bi-directional muxing and demuxing of mixed-rate OC3/OC12 signals in the add/drop and the drop/continue configurations of FIGS. 1 and 2, respectively, in a DWDM network.

For the bi-directional add/drop application of FIG. 1, there are two boards in two nodes, and a total of four muxing and demuxing time domains are timed with user- or system-selected timing sources to establish bi-directional transmission. As described earlier in the context of FIG. 1, each muxed OC48 signal from one node is split into two optical signals and carried through physically diverse routes. The two optical signals are received by the demux of the other node. The demux selects one of the inputs for demuxing.

To minimize SONET/SDH pointer adjustments in the demux, the two demux timing domains are timed with the clock recovered from the currently selected OC48 input (as specified by control signal SEL_DATA). The timing source for the demux domain is not selected by the user. A protection switch from the selected to the second OC48 input is followed by an automatic switch of the timing source to the clock recovered from that input. When a failure of both OC48 inputs is detected (as specified by control signal SEL_CLK), the demux timing source is switched to the local clock from generator 1514.

Muxing timing sources are selected by the user. The user gives priority for each timing source, highest priority (P3) for the muxing clock, second priority (P2) for its backup, and third priority (P1) for the backup of the backup. All remaining timing sources are given the lowest priority (P0) that inhibits their use as the muxing source. Protection switching from the muxing clock to the P2 backup clock, and from the P2 backup clock to the P1 backup clock is revertive. This means that as soon as the failed clock is fixed, its status is changed to the same as before the failure (i.e., to be the muxing clock or the P2 backup clock). In one implementation, the local clock is always selected as either the muxing clock or as P2 backup clock of the muxing clock.

A failure of the muxing clock is hardware-detected by the local loss-of-clock (LOC) detector 1518 and autonomously hardware-switched to the backup clock. A protection switch to the valid P2 backup clock is a fast hardware switch, because it is implemented by local LOC detector 1518. A protection switch to the valid P1 backup clock in the presence of the failed P2 backup clock is a slower software switch, which is implemented by the remote board controller. High reliability of local clock generator 1514 minimizes the probability of the slower protection switch.

Each clock is in one of the two states: "valid" or "invalid." The OC3/OC12 input clocks are invalidated upon detection of an OOF, LOF, LOC, LOS, or line-alarm-indication-signal (LAIS) condition. When an input clock is selected as the muxing clock, it is invalidated and switched to the backup clock upon detection of the "holdover" state of the S1 synchronization byte, indicating that the signal from which the clock is recovered, is timed with a low accuracy clock. The OC48 input clock is invalidated upon detection of the OOF/LOF/LOC/LOS condition. The local clock is invalidated upon detection of the LOC condition at its output. The user queries the state of the S1 synchronization bytes of the incoming OC3/OC12 signals to identify high accuracy signals and, if such exist, uses them as the priority timing sources. When the S1 bytes of more than one input signal indicate that the signals are the timing source at the customers' drop sites, the equal stratum-level signals not selected for muxing lose their stratum-level traceability. Their S1 bytes are changed to the "don't use" state. The S1 bytes of lower stratum-level signals not selected for muxing are not changed; they maintain their stratum-level traceability.

In the four-time-domain system, the two demuxing clocks are recovered from the OC48 input. Since these clocks are derived from the muxing clocks, this leaves two independent timing sources selected for the two muxing time domains. In the data applications, with input clocks of less than Stratum-3 accuracy, the local Stratum-3 clock is selected as the muxing clock and the OC48 input clock as its backup. In this configuration, a failed local clock is switched to the OC48 input clock leaving only one independent timing source in the four-time-domain system. A failure of the second local clock and a switch to its OC48 input clock backup or a manual switch to the OC48 input clock creates a four-time-domain system with no independent timing source. This is an unstable state called "timing loop" that causes a drift of the common clock with no independent timing source. To protect against such loop-timing problems, whenever an OC48 input clock is selected as the muxing clock, a message is sent to the other node to invalidate the OC48 input clock from being selected as the muxing clock in that node.

The uni-directional drop/continue application of FIG. 2 requires one timing domain for the muxing and the demuxing. This is done by selection of the muxing timing source as the timing source for both muxing and demuxing. All the features of the timing source are the same as the ones of the muxing timing source described above for the add/drop application of FIG. 1.

In operation, the board controller identifies the priority P3 muxing clock and its priority P2 backup and selects it with muxes M3 and M4, since one of them must be one of the clocks recovered by transceiver circuitry 1504 from the OC3/OC12 inputs or the OC48 input clock recovered by CDR circuit 1528 or CDR circuit 1534. Next, the selected clock is normalized to a 155-MHZ rate and input to mux M8. If the local clock is selected as the muxing clock, then the board controller switches mux M8 to select it as the muxing clock. If not, then the local clock should be selected as the priority P2 backup clock, and the board controller selects the normalized output from mux M6 as the muxing clock. Mux PLL 1522 multiplies the output from mux M8 to the 622-MHZ rate required by mux/demux circuitry 1502.

LOC detector 1518 detects an LOC condition and controls an automatic, hardware switch to the second input of mux M8. Mux M8 can also be switched by the board controller using a software switch. A detected LOC condition generates an interrupt to the board controller (i.e., GPIO(53)) to select a new backup clock to replace the failed clock. If the failed clock is not the local clock, then the board controller is able to select a new backup clock using a software switch at muxes M3 and M4 to allow another hardware switch at mux M8 in case of a subsequent failure of the muxing clock. If the failed clock is the local clock, then the board controller is not able to replace it with a new backup clock. In that case, if the new muxing clock fails, the subsequent hardware switch will not be successful and should therefore be followed with a software switch from the board controller. This results in a slow protection switch of the muxing clock. A second level of protection of the muxing clock is achieved when the user assigns priority P1 backup clock. With no priority P1 backup clock, a failure of the muxing clock or the priority P2 backup clock raises the "no backup" alarm.

Figure 16:
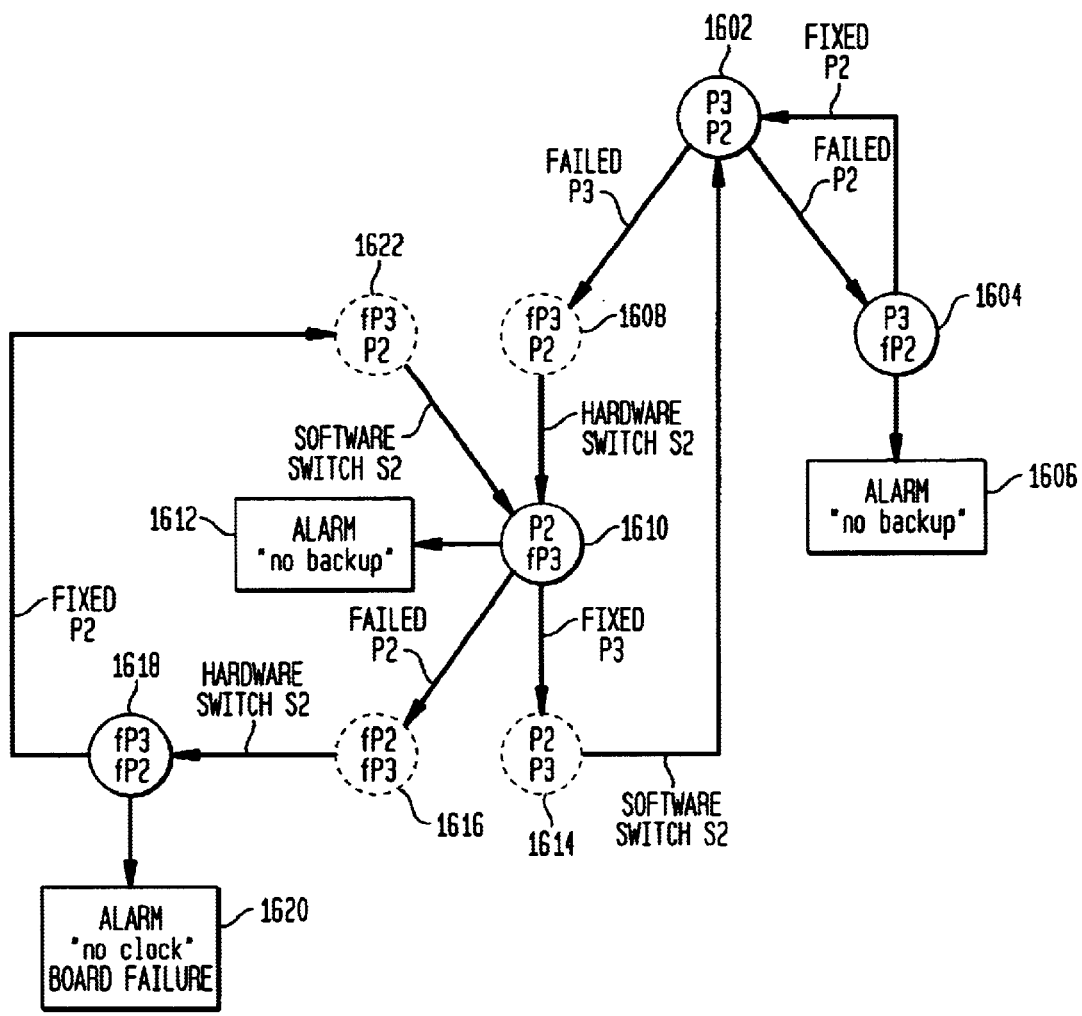
FIG. 16 shows a state transition diagram that models the protection of a priority 3 muxing clock with a priority 2 backup clock, according to one embodiment of the present invention.

FIG. 16 shows a state transition diagram that models the protection of the priority 3 muxing clock P3 with the priority 2 backup clock P2, according to one embodiment of the present invention. In FIG. 16, the top symbol within each node of the diagram is the muxing clock, and the bottom symbol is its priority 2 backup. A failed clock is indicated by the prefix "f". In FIG. 16, transient states are indicated with dashed circles.

Failed OC3/OC12 input clocks and OC48 inputs clocks do not require maintenance. On the other hand, a failed local clock does require maintenance. When the local clock is backed-up, scheduled maintenance can be performed, but, when the local clock is not backed-up, immediate maintenance should be performed.

At state 1602 of FIG. 16, clock P3 is the muxing clock and clock P2 is its priority 2 backup. If clock P2 fails (fP2), then a transition to state 1604 occurs, which results in a "no backup" alarm 1606 that interrupts the board controller to change the state of the failed clock of "invalid." When the P2 clock is fixed, a transition from state 1604 back to state 1602 occurs.

When at state 1602, if clock P3 fails (fP3), the failure is hardware-detected (i.e., by LOC detector 1518 of FIG. 15), in which case, a hardware switch S2 (flipping fP3 with P2) is implemented (i.e., by flip-flop FF1 and mux M8 of FIG. 15) to select backup clock P2 as the muxing clock, resulting in transitions from state 1602 through transient state 1608 to state 1610, where a "no backup alarm" 1612 is generated.

When at state 1610, if clock P3 gets fixed, then that condition is software-detected (i.e., by the board controller) and a software switch S2 (flipping P2 with P3) is implemented (i.e., using control signals MXSEL0 and MXSEL1 input to flip-flop FF1 in FIG. 15) to select fixed clock P3 as the muxing clock, resulting in transitions from state 1610 through transient state 1614 back to original state 1602. This is an example of a revertive switch that ensures that the highest priority, valid clock is selected for muxing, with the next highest priority, valid clock selected as its backup.

When at state 1610, if clock P2 fails, then a hardware switch S2 (flipping fP2 with fP3) is implemented to select failed clock fP3 as the muxing clock, resulting in transitions from state 1610 through transient state 1616 to state 1618, where a "no clock" (board failure) alarm 1620 is generated.

When at state 1618, if clock P2 gets fixed, then a software switch S2 (flipping fP3 with P2) is implemented to select fixed clock P2 as the muxing clock, resulting in transitions from state 1618 through transient state 1622 back to state 1610, where the "no backup" alarm 1612 is once again generated.

When at state 1618, if clock P3 gets fixed, then a transition (not shown in FIG. 16) occurs from state 1618 back to state 1604, where the "no backup" alarm 1606 is once again generated.

FIG. 16 corresponds to a situation in which no priority 1 clock has been assigned to back up the priority 3 and priority 2 clocks. In this case, there is no protection if both the priority 3 and priority 2 clocks fail.

Figure 17:
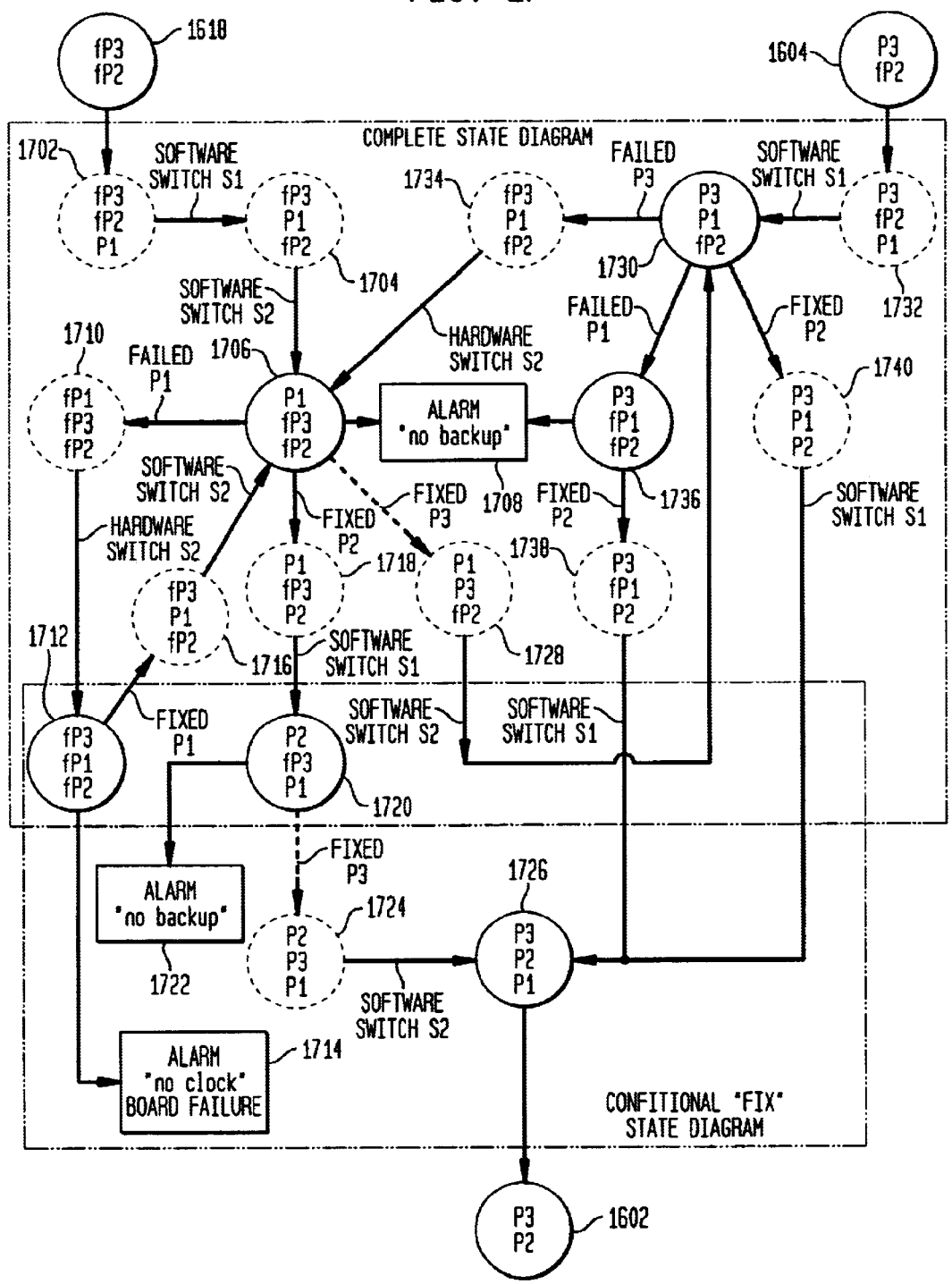
FIGS. 17 and 18 show state transition diagrams that model the protection of a priority 3 muxing clock and a priority 2 backup clock with a priority 1 backup clock, according to one embodiment of the present invention.
Figure 18:
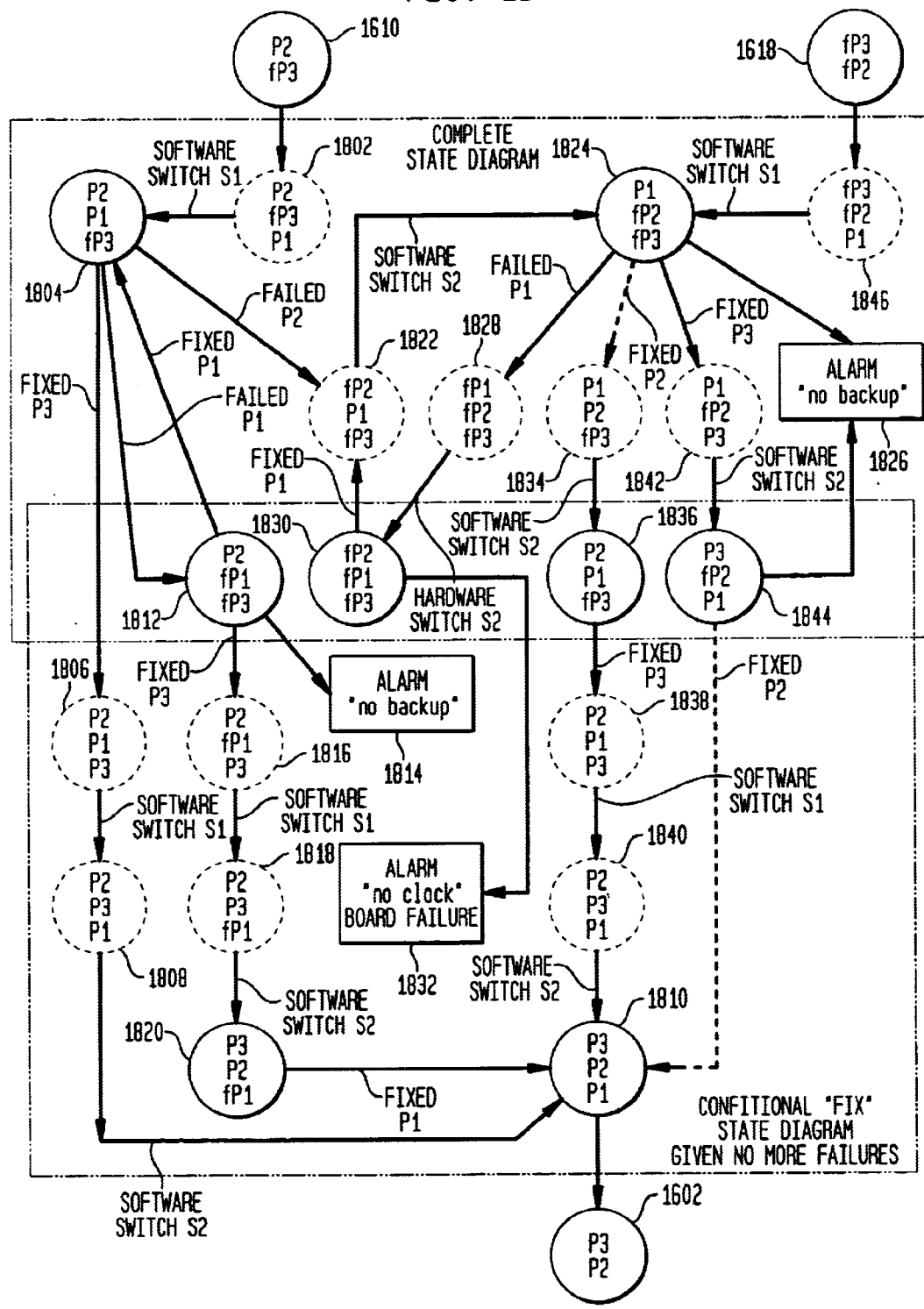

FIGS. 17 and 18 show state transition diagrams that model the protection of the priority 3 muxing clock P3 and the priority 2 backup clock P2 with the priority 1 backup clock P1, according to one embodiment of the present invention. FIGS. 17 and 18 rely on the same drawing conventions described earlier for FIG. 16. The top portion of each of FIGS. 17 and 18 gives a complete state diagram of how the states are protected (made transient) by the not-failed priority 1 backup clock and all transitions to the next states corresponding to failures and fixes of the priority 1 backup clock P1. The bottom portion of each of FIGS. 17 and 18 gives a conditional "fix" state diagram as the failed clocks are fixed, assuming no failures during the fix process. If a failure does happen, then a "board failure" alarm is raised (not shown).

An assignment of the priority 1 backup clock P1 activates a second level of protection in case of failures of either the priority 2 backup clock P2 or the muxing clock P3 or both. According to the hardware design of FIG. 15, the local clock is always selected as the muxing clock or as the priority 2 backup clock. This gives two cases: (1) when the local clock is selected as the muxing clock P3, and (2) when the local clock is selected as the priority 2 backup clock P2. When the local clock is selected as the priority 3 muxing clock, the assignment of a valid, priority 1 backup clock makes states 1618 (fP3, fP2) and 1604 (P3, fP2) of FIG. 16 transient, thus eliminating corresponding "no clock" and "no backup" alarm conditions 1620 and 1604. When the local clock is selected as the priority 2 backup clock, the assignment of a valid, priority 1 backup clock makes state 1610 (P2, fP3) transient, thus eliminating corresponding "no backup" alarm condition 1612.

The additional protection is achieved through control by the board controller of a software switch S1 (i.e., implemented using muxes M3, M4, and M5 in FIG. 15). While an execution of the software/hardware switch S2 flips the top symbol with the one underneath, software switch S1 flips the top symbol with the one on the bottom, or the two lowest symbols. When the software switch S1 flips a failed clock symbol in the top position with a good clock symbol in the bottom position, this corresponds to the slow protection switch of the failed muxing clock. High reliability of the local clock makes this a low probability event.

According to the hardware design of FIG. 15, each state in FIG. 17 has either good (P3) or failed (fP3) symbol on the top two positions, which reflects the selection of the local clock as the preferred muxing clock. Similarly, according to the hardware design of FIG. 15, each state in FIG. 18 has either good (P2) or failed (fP2) symbol on the top two positions that reflects the selection of the local clock as the priority 2 backup clock. In FIGS. 17 and 18, scheduled maintenance to fix a failed local clock is indicated with dashed lines.

In particular, referring to FIG. 17, assuming the assignment of the priority 1 back clock P1, non-transient state 1618 of FIG. 16 becomes transient state 1702, which would be software-detected (i.e., by the board controller), in which case, a software switch S1 (flipping fP2 with P1) is implemented to select clock P1 as the priority 2 backup clock, followed by a software switch S2 (flipping fP3 with P1) to select clock P1 as the muxing clock, resulting in transitions from transient state 1702 through transient state 1704 to state 1706, where the "no backup alarm" 1708 is generated.

When at state 1706, if clock P1 fails, then a hardware switch S2 would be implemented (flipping fP1 with fP3) to select failed clock fP3 as the muxing clock, resulting in transitions from state 1706 through transient state 1710 to state 1712, where a "no clock" (board failure) alarm 1714 is generated.

When at state 1712, if clock P1 gets fixed, then a software switch S2 is implemented (flipping fP3 with P1) to select fixed clock P1 as the muxing clock, resulting in transitions from state 1712 through transient state 1716 to back to state 1706.

When at state 1706, if clock P2 gets fixed, a revertive software switch S1 is implemented (flipping P1 with P2) to select fixed clock P2 as the muxing clock, resulting in transitions from state 1706 through transient state 1718 to state 1720, where a "no backup" alarm 1722 is generated.

When at state 1720, if clock P3 gets fixed, a revertive software switch S2 is implemented (flipping P2 with P3) to select fixed clock P3 as the muxing clock, resulting in transitions from state 1720 through transient state 1724 to state 1726, which is equivalent to state 1602 of FIG. 16 with an assigned priority 1 backup clock P1.

When at state 1706, if clock P3 gets fixed, a revertive software switch S2 is implemented (flipping P1 with P3) to select fixed clock P3 as the muxing clock, resulting in transitions from state 1706 through transient state 1728 to state 1730.

Similarly, assuming the assignment of the priority 1 backup clock P1, non-transient state 1604 of FIG. 16 becomes transient state 1732, which would be software-detected (i.e., by the board controller), in which case, a software switch S1 (flipping fP2 with P1) is implemented to select clock P1 as the priority 2 backup clock, resulting in a transition from transient state 1732 to state 1730.

When at state 1730, if clock P3 fails, then a hardware switch S2 would be implemented (flipping fP3 with P1) to select clock P1 as the muxing clock, resulting in transitions from state 1730 through transient state 1734 to state 1706, where the "no backup" alarm 1708 is generated.

When at state 1730, if clock P1 fails, then a transition from state 1730 to state 1736 occurs, where the "no backup" alarm 1708 is generated.

When at state 1736, if clock P2 gets fixed, then a software switch S1 would be implemented (flipping fP1 with P2) to select clock P2 as the priority 2 backup clock, resulting in transitions from state 1736 through transient state 1738 to state 1726. The transition from transient state 1738 to state 1726 is achieved by the board controller replacing the failed backup clock fP1 with another valid backup clock P1. As soon as the board controller selects a new backup clock P1, a software switch S1 is implemented directly to that clock, resulting in a direct transition to state 1726, where all clocks are valid.

When at state 1736, if clock P1 gets fixed, then a transition from state 1736 back to state 1730 occurs (not shown in FIG. 17).

When at state 1736, if clock P3 fails, then a hardware switch S2 would be implemented (flipping fP3 with fP1) to select failed clock fP1 as the muxing clock, resulting in a transition from state 1736 through a transient state corresponding to (fP3, fP1, fP2) to a state corresponding to (fP1, fP3, fP2) (neither shown in FIG. 17), which is substantially equivalent to state 1712, where a "no clock" (board failure) alarm similar to alarm 1714 is generated.

When at state 1730, if clock P2 gets fixed, a revertive software switch S1 is implemented (flipping P1 with P2) to select fixed clock P2 as the priority 2 backup clock, resulting in transitions from state 1730 through transient state 1740 to state 1726.

Referring to FIG. 18, assuming the assignment of the priority 1 back clock P1, non-transient state 1610 of FIG. 16 becomes transient state 1802, which would be software-detected (i.e., by the board controller), in which case, a software switch S1 (flipping fP3 with P1) is implemented to select clock P1 as the priority 2 backup clock, resulting in transitions from transient state 1802 to state 1804.

When at state 1804, if clock P3 gets fixed, then a revertive software switch S1 would be implemented (flipping P1 with P3) followed by a revertive software switch S2 (flipping P2 with P3) to select fixed clock P3 as the muxing clock and clock P2 as the priority 2 backup clock, resulting in transitions from state 1804 through transient states 1806 and 1808 to state 1810, which is equivalent to state 1602 of FIG. 16.

When at state 1804, if clock P1 fails, then a transition from state 1804 to state 1812 occurs, where a "no backup" alarm 1814 is generated.

When at state 1812, if clock P1 gets fixed, then a transition from state 1812 back to state 1804 occurs.

When at state 1812, if clock P3 gets fixed, then a software switch S1 would be implemented (flipping fP1 with P3) followed by a revertive software switch S2 (flipping P2 with P3) to select fixed clock P3 as the muxing clock and clock P2 as the priority 2 backup clock, resulting in transitions from state 1812 through transient states 1816 and 1818 to state 1820.

When at state 1820, if clock P1 gets fixed, then a transition from state 1820 to state 1810 occurs.

When at state 1804, if clock P2 fails, then a software switch is implemented (flipping fP2 with P1) to select clock P1 as the muxing clock, resulting in transitions from state 1804 through transient state 1822 to state 1824, where a "no backup" alarm 1826 is generated.

When at state 1824, if clock P1 fails, then a hardware switch S2 is implemented (flipping fP1 with fP2) to select failed clock fP2 as the muxing clock, resulting in transitions from state 1824 through transient state 1828 to state 1830, where a "no clock" (board failure) alarm occurs 1832.

When at state 1830, if clock P1 gets fixed, then a software switch S2 is implemented (flipping fP2 with P1) to select fixed clock P1 as the muxing clock, resulting in transitions from state 1830 through transient state 1822 back to state 1824.

When at state 1824, if clock P2 gets fixed, then a revertive software switch S2 is implemented (flipping P1 with P2) to select fixed clock P2 as the muxing clock, resulting in transitions from state 1824 through transient state 1834 to state 1836.

When at state 1836, if clock P3 gets fixed, then a revertive software switch S1 is implemented (flipping P1 with P3) followed by a revertive software switch S2 (flipping P2 with P3) to select fixed clock P3 as the muxing clock and clock P2 as the priority 2 backup clock, resulting in transitions from state 1836 through transient states 1838 and 1840 to state 1810.

When at state 1824, if clock P3 gets fixed, then a revertive software switch S2 is implemented (flipping P1 with P3) to select fixed clock P3 as the muxing clock, resulting in transitions from state 1824 through transient state 1842 to state 1844, where the "no backup" alarm 1826 is generated.

When at state 1844, if clock P2 gets fixed, then a transition from state 1844 to state 1810 occurs.

As before, the assignment of the priority 1 back clock P1 causes non-transient state 1618 of FIG. 16 to become transient state 1846, which would be software-detected (i.e., by the board controller), in which case, a software switch S1 (flipping fP3 with P1) is implemented to select clock P1 as the muxing clock, resulting in transitions from transient state 1846 to state 1824.

The present invention has been described in the context of an OC48 frame in which each OC12signal must be positioned within a quad (i.e., four consecutive STS3 time slots). It alternative implementations of the present invention, this criterion may be relaxed. For example, in some implementations, circular symmetry may be allowed, in which an OC12 signal may "wrap around" within the OC48 frame. For example, an OC12 signal may be positioned at the $14^{th}$, $15^{th}$, $6^{th}$, and $1^{st}$ STS3 time slots, starting at the $14^{th}$ STS3 time slot and ending at the $1^{st}$ STS3 time slot. Moreover, in some implementations, an OC12 signal may be positioned within any four STS3 time slots, whether they are consecutive or not.

Although the present invention has been described in the context of circuit boards that can handle up to eight different OC3/OC12 customer signals in each direction, those skilled in the art will understand that, in alternative embodiments, up to 16 different OC3-rate signals could be packed into a single OC48 optical signal.

Although the present invention has been described in the context of nodes for SONET-based DWDM optical communication networks that support OC3, OC12, and OC48 signals, those skilled in the art will understand that alternative embodiments of the present invention could be implemented for other signal rates (e.g., combining OC3, OC12, and OC48 signals into OC 192 signals), for multiplexing other than DWDM including time division multiplexing (TDM), and/or for communication protocols other than SONET.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A first node for an optical communication network, the first node having circuitry comprising:

(a) a first set of one or more receivers configured to generate one or more incoming customer data signals and one or more customer clocks from one or more incoming electrical customer signals;

(b) a first clock-and-data-recovery (CDR) circuit configured to generate a first incoming data signal and a first input clock from an incoming electrical signal having a third frame format at a third data rate;

(c) a local clock generator configured to generate a local clock;

(d) muxing circuitry configured to combine the one or more incoming customer data signals into an outgoing data signal having the third frame format;

(e) demuxing circuitry configured to split the first incoming data signal into one or more outgoing customer data signals;

(f) a set of one or more transmitters configured to transmit each outgoing customer data signal as an outgoing electrical customer signal; and (g) timing circuitry configured to select a muxing clock for the muxing circuitry and a demuxing clock for the demuxing circuitry from the one or more customer clocks, the first input clock, and the local clock.

2. The invention of claim 1, wherein the set of one or more receivers comprises two or more receivers configured to receive two or more incoming electrical customer signals, wherein:

at least one incoming electrical customer signal has a first frame format at a first data rate;

at least one other incoming electrical customer signal has a second frame format at a second data rate greater than the first data rate; and the third data rate is greater than the second data rate.

3. The invention of claim 2, wherein:

the first data rate is an OC3 data rate and the first frame format is an OC3 frame format;

the second data rate is an OC12 data rate and the second frame format is an OC12 frame format; and the third data rate is an OC48 data rate and the third frame format is an OC48 frame format.

4. The invention of claim 3, wherein:

the muxing circuitry is capable of combining up to eight different OC3/OC12-rate incoming electrical customer signals into a single OC48-rate outgoing electrical signal; and the demuxing circuitry is capable of splitting a single OC48-rate incoming electrical signal into up to eight different OC3/OC12-rate outgoing electrical customer signals.

5. The invention of claim 1, wherein:

the sets of one or more receivers and transmitters are implemented in a set of one or more transceivers; and the muxing circuitry and the demuxing circuitry are implemented in combined muxing/demuxing circuitry.

6. The invention of claim 1, further comprising:

(h) a second CDR circuit configured to generate a second incoming data signal and a second input clock from a second copy of the incoming electrical signal having the third frame format; and (i) fault protection circuitry for selecting (1) one of the first and second incoming data signals for processing by the demuxing circuitry and (2) one of the first and second input clocks for input to the timing circuitry.

7. The invention of claim 1, wherein the timing circuitry is configurable for either an add/drop configuration or a drop/continue configuration, wherein:

when configured for the add/drop configuration, the timing circuit is configured to select (1) the muxing clock from the one or more customer clocks, the first input clock, and the local clock and (2) the demuxing clock from the first input clock and the local clock; and when configured for the drop/continue configuration, the timing circuit is configured to select both the muxing and demuxing clocks from either the first input clock or the local clock.

8. The invention of claim 1, wherein the timing circuitry is configured to perform a hardware-based switch to select a backup clock as a new muxing clock upon detection of a loss-of-clock (LOC) condition of a previously selected muxing clock.

9. The invention of claim 8, wherein the timing circuitry comprises:
   (a) a mux configured to receive and select one of the previously selected muxing clock and the backup clock;
   (b) an LOC detector configured to receive the previously selected muxing clock from the mux and to generate an LOC signal upon detection of the LOC condition; and
   (c) a flip-flop configured to receive the LOC signal and to generate a control signal for the mux to select the backup clock as the new muxing clock.

10. The invention of claim 8, wherein the timing circuitry performs the hardware-based switch independent of any processing external to the timing circuitry.

11. The invention of claim 8, wherein, when the previously selected muxing clock is the local clock, the backup clock is selected from the one or more customer clocks and the first input clock.

12. The invention of claim 11, wherein:
   when the backup clock is a customer clock, the first node determines whether the customer clock is valid from header information in the corresponding incoming customer data signal; and
   if the customer clock is no longer valid, then the first node selects another customer clock or the first input clock as the backup clock.

13. The invention of claim 1, wherein the first node automatically communicates with a corresponding second node regarding their respective muxing clocks in order to avoid loop-timing problems.

14. The invention of claim 13, wherein, when the first node is informed that the second node's muxing clock is the second node's first input clock, then the first node invalidates its first input clock.

15. The invention of claim 1, wherein:
   the first node selects a highest priority clock, a middle priority clock, and a lowest priority clock from the one or more customer clocks, the first input clock, and the local clock; and
   when (1) the highest priority clock is selected as the muxing clock, (2) the middle priority clock is selected as a first backup clock; and (3) the lowest priority clock is selected as a second backup clock, then:
      (a) the middle priority clock is selected as the muxing clock upon detection of an LOC condition in the highest priority clock;
      (b) the lowest priority clock is selected as the first backup clock upon detection of an LOC condition in the middle priority clock; and
      (c) the lowest priority clock is selected as the muxing clock upon detection of LOC conditions in both the highest priority clock and the middle priority clock.

16. The invention of claim 15, wherein:
   the selection of the middle priority clock as the muxing clock is implemented using a hardware-based switch independent of any processing external to the timing circuitry; and
   the selection of the lowest priority clock as either the muxing clock or the first backup clock is implemented using a software-based switch.

17. The invention of claim 16, wherein the timing circuitry comprises:
   (a) first switch circuitry configured to implement the hardware-based switch and a first type of software-based switch, both of which flip the highest priority clock with the middle priority clock; and
   (b) second switch circuitry configured to implement a second type of software-based switch which flips either (i) the highest priority clock with the lowest priority clock or (ii) the middle priority clock with the lowest priority clock.

18. Circuitry for a first node of an optical communication network, the circuitry comprising:
   (a) a first set of one or more receivers configured to generate one or more incoming customer data signals and one or more customer clocks from one or more incoming electrical customer signals;
   (b) a first clock-and-data-recovery (CDR) circuit configured to generate a first incoming data signal and a first input clock from an incoming electrical signal having a third frame format at a third data rate;
   (c) a local clock generator configured to generate a local clock;
   (d) muxing circuitry configured to combine the one or more incoming customer data signals into an outgoing data signal having the third frame format;
   (e) demuxing circuitry configured to split the first incoming data signal into one or more outgoing customer data signals;
   (f) a set of one or more transmitters configured to transmit each outgoing customer data signal as an outgoing electrical customer signal; and
   (g) timing circuitry configured to select a muxing clock for the muxing circuitry and a demuxing clock for the demuxing circuitry from the one or more customer clocks, the first input clock, and the local clock.

19. The invention of claim 1, wherein the timing circuitry is capable of selecting the muxing clock to be different from the demuxing clock.

20. The invention of claim 18, wherein the timing circuitry is capable of selecting the muxing clock to be different from the demuxing clock.

* * * * *